(12) United States Patent
Cook et al.

(10) Patent No.: US 11,757,886 B2
(45) Date of Patent: Sep. 12, 2023

(54) ANALYSIS OF ROLE REACHABILITY USING POLICY COMPLEMENTS

(71) Applicant: Amazon Technologies, Inc., Seattle, WA (US)

(72) Inventors: John Byron Cook, Brooklyn, NY (US); Neha Rungta, San Jose, CA (US); Carsten Varming, Brooklyn, NY (US); Daniel George Peebles, Richland, WA (US); Daniel Kroening, Oxford (GB); Alejandro Naser Pastoriza, Madrid (ES)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 17/119,868

(22) Filed: Dec. 11, 2020

(65) Prior Publication Data
US 2022/0191206 A1     Jun. 16, 2022

(30) Foreign Application Priority Data

Dec. 10, 2020     (ES) .............................. ES202031234

(51) Int. Cl.
*H04L 9/40*     (2022.01)
*H04L 41/0604*     (2022.01)
(Continued)

(52) U.S. Cl.
CPC ............ *H04L 63/101* (2013.01); *G06F 21/62* (2013.01); *H04L 41/0627* (2013.01);
(Continued)

(58) Field of Classification Search
CPC ... H04L 63/101; H04L 41/0627; H04L 41/22; H04L 63/0435; H04L 63/10; H04L 63/20; H04L 63/105; G06F 21/62; G06F 16/9024
See application file for complete search history.

(56) References Cited

U.S. PATENT DOCUMENTS 8,875,230 B1 * 10/2014 Weiner .................... H04L 63/10
  726/1
9,736,182 B1 *  8/2017 Madhukar ............. H04L 63/102
(Continued)

OTHER PUBLICATIONS

International Search Report and Written Opinion dated Feb. 25, 2022 in International Application No. PCT/US2021/062584, Amazon Technologies, Inc., pp. 1-11.
(Continued)

*Primary Examiner* — Cheng-Feng Huang
(74) *Attorney, Agent, or Firm* — Robert C. Kowert; Kowert, Hood, Munyon, Rankin & Goetzel, P.C.

(57) ABSTRACT

Methods, systems, and computer-readable media for analysis of role reachability using policy complements are disclosed. An access control analyzer determines two nodes in a graph that potentially have a common edge. The nodes correspond to roles in a provider network, and the roles are associated with first and second access control policies that grant or deny access to resources. The access control analyzer performs a role reachability analysis that determines whether the first role can assume the second role for a particular state of one or more key-value tags. The role reachability analysis determines a third access control policy authorizing a negation of a role assumption request for the second role. The role reachability analysis performs analysis of the third access control policy with respect to a role assumption policy for the second role for the particular state of the one or more key-value tags.

20 Claims, 9 Drawing Sheets

(51) Int. Cl.
*H04L 41/22* (2022.01)
*G06F 21/62* (2013.01)
*G06F 16/901* (2019.01)

(52) U.S. Cl.
CPC .......... *H04L 41/22* (2013.01); *H04L 63/0435* (2013.01); *H04L 63/10* (2013.01); *H04L 63/105* (2013.01); *H04L 63/20* (2013.01); *G06F 16/9024* (2019.01)

(56) References Cited

U.S. PATENT DOCUMENTS

| | | | |
|---|---|---|---|
| 10,630,695 | B2 | 4/2020 | Cook et al. |
| 10,680,958 | B2 | 6/2020 | Guan et al. |
| 10,757,128 | B2 | 8/2020 | Cook et al. |
| 2010/0064349 | A1* | 3/2010 | Randle .................. H04L 63/10 709/228 |
| 2013/0298184 | A1* | 11/2013 | Ermagan ................ G06F 21/54 726/1 |
| 2015/0163158 | A1 | 6/2015 | Ryalnd |
| 2015/0269383 | A1* | 9/2015 | Lang ...................... G06F 21/57 726/1 |
| 2018/0234416 | A1* | 8/2018 | Moerk .................... H04L 63/08 |
| 2018/0247073 | A1* | 8/2018 | Kreutzer ............ G06F 16/9535 |
| 2018/0288098 | A1* | 10/2018 | Wang .................. G06F 16/9024 |
| 2019/0327271 | A1* | 10/2019 | Saxena ............... H04L 41/0895 |
| 2020/0007455 | A1 | 1/2020 | Chhabra et al. |
| 2020/0296139 | A1* | 9/2020 | Fainberg ............... H04L 63/205 |
| 2020/0336489 | A1* | 10/2020 | Wuest .................. H04L 63/102 |
| 2021/0377314 | A1 | 12/2021 | Miller et al. |
| 2022/0159003 | A1* | 5/2022 | Butcher ................ H04L 63/101 |

OTHER PUBLICATIONS

Graham Hughes, et al., "Automated Verification of Access Control Policies Using a SAT Solver", International Journal on Software Tools for Technology Transfer (STTT) 10(6), Aug. 15, 2008, Source: https://sites.cs.ucsb.edu/~bultan/publications/sttt08.pdf, pp. 503-520.

Gerben Kleijn, "Blocking Privileged Escalation Attacks in Amazon Web Services (AWS)", CyberDefenseMagazine.com, Jan. 2020, pp. 1-2.

Martin Abadi, et al., "A Calculus for Access Control in Distributed Systems", ACM Transactions on Programming Languages and Systems 15(4), 1993, pp. 1-29.

Ninghui Li, et al., "Delegation Logic: A Logic-based Approach to Distributed Authorization", ACM Transactions on Information and System Security (TISSEC) 6(1), 2003, pp. 128-171.

"Elevating Permissions in AWS IAM", CloudSploit.com, Feb. 2017, Source: https://blog.cloudsploit.com/privilege-escalation-in-amazon-web-services-cb4837365958, pp. 1-6.

Dimitar P. Guelev, et al., "Model-Checking Access Control Policies (Extended Abstract)", In ISC. vol. 3225, In ISC. vol. 3225, Source: https://www.researchgate.net/publication/220905294_Model-Checking_Access_Control_Policies/link/09e41506c2cb591be4000000/download, pp. 219-230.

Spencer Gietzen, "Assume the Worst: Enumerating AWS Roles through 'AssumeRole'", RhinoSecurityLabs.com, Source: https://rhinosecuritylabs.com/aws/assume-worst-aws-assume-role-enumeration/, Aug. 2018, pp. 1-7.

Spencer Gietzen, "AWS IAM Privilege Escalation—Methods and Mitigation", RhinoSecurityLabs.com, Source: https://rhinosecuritylabs.com/aws/aws-privilege-escalation-methods-mitigation/, Aug. 2018, pp. 1-19.

John Backes, et al., "Semantic-base Automated Reasoning for AWS Access Policies using SMT", In 2018 Formal Methods in Computer Aided Design (FMCAD), 2018, Source: https://www.cs.utexas.edu/users/hunt/FMCAD/FMCAD18/papers/paper3.pdf, pp. 1-9.

Daniel J. Dougherty, et al., "Specifying and Reasoning about Dynamic Access-Control Policies", In IJCAR. vol. 4130, Springer, 2006, Source: https://web.cs.wpi.edu/~dd/publications/ijcar06.pdf, pp. 632-646.

Kathi Fisler, et al., "Verification and Change-Impact Analysis of Access-Control Policies", In Proceedings of the 27th International Conference on Software Engineering 2005, IEEE, 2005, pp. 196-205.

U.S. Appl. No. 17/119,855, filed Dec. 11, 2020, John Byron Cook et al.

* cited by examiner

ANALYSIS OF ROLE REACHABILITY USING POLICY COMPLEMENTS

RELATED APPLICATION

This application claims benefit of priority to Spanish Patent Application No. P202031234 filed on Dec. 10, 2020 entitled "ANALYSIS OF ROLE REACHABILITY USING POLICY COMPLEMENTS", which is hereby incorporated by reference in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

A distributed system may provide remote clients with access to various services that are implemented largely within the distributed system and that are accessible via a network such as the Internet. Examples of such systems include online merchants, internet service providers, corporate networks, cloud computing services, web-based hosting services, and so on. Distributed systems may place a high importance on security of user access to system resources using appropriate permissions. Resource owners and resource administrators often use such access control policies to control access by users to computing resources in order to support the requirements of resource owners, administrators, and users. Defining and maintaining user roles, permissions, or policies can grow increasingly complex, particularly as the size and/or complexity of the system or the number of computer system users increases.

Figure 1:
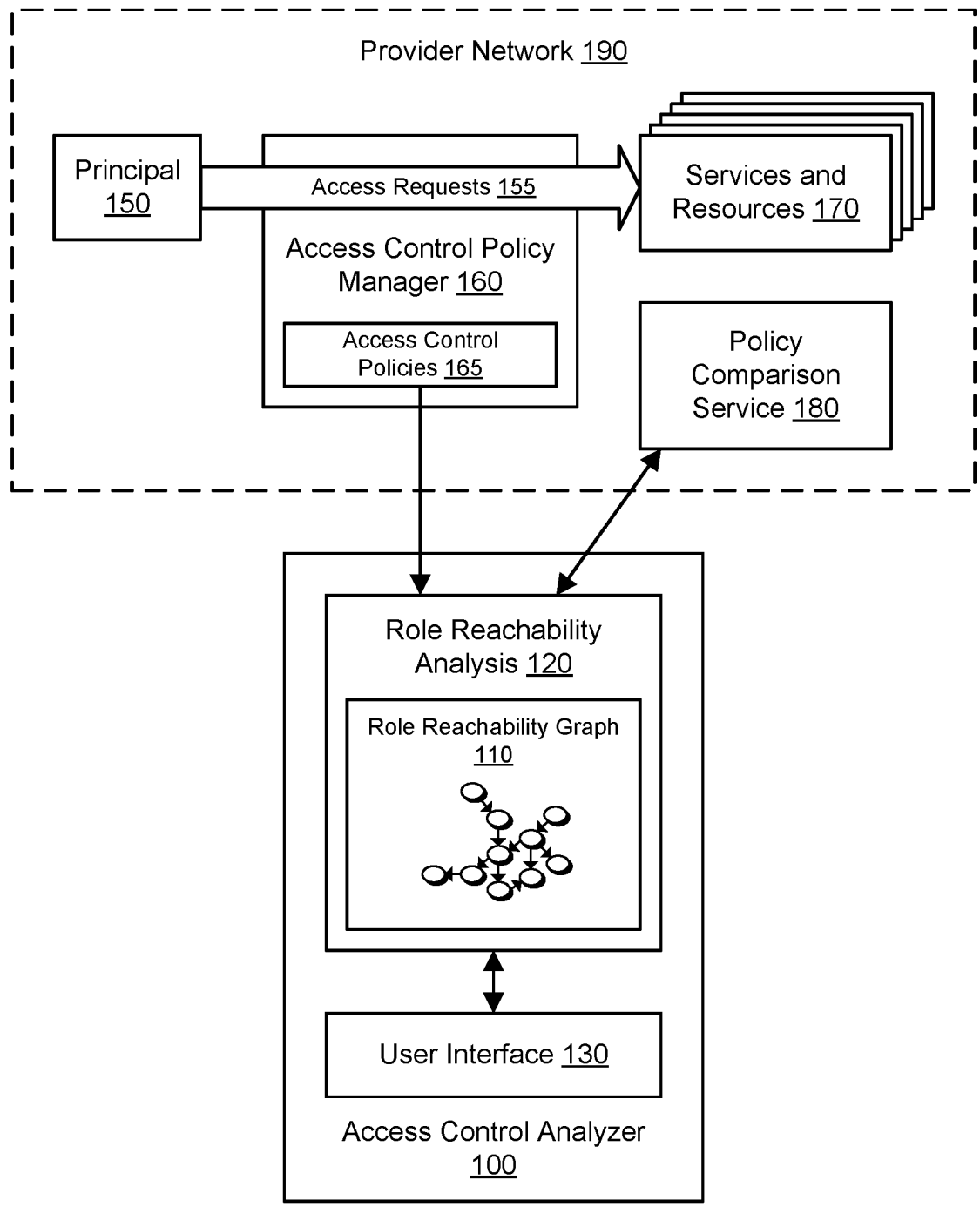
FIG. 1 illustrates an example system environment for analysis of role reachability with transitive tags, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for analysis of role reachability with transitive tags are described. Software products (e.g., services or applications) may be executed in a distributed system, service-oriented system, or cloud provider network that includes a variety of resources and other services. To permit or deny access to such resources and services, the distributed system may offer integrated techniques for enforcing access control policies using authentication and authorization. Using prior approaches for access control policy management, delegated role-based management and attribute-level tag-based management were used to control access to resources in distributed systems. In some approaches, role-based management has been combined with tag-based management. For example, a cloud provider network may support transitive or "sticky" session tags which allow users to persist constraints over tags along a role-assumption chain. In some circumstances, a policy configuration may lead to unexpected privilege escalation in the presence of subtle transitive tag behavior with potential overlapping string constraints. In such a system, it may be desirable to determine whether a particular user or role, given a particular transitive tag state, can gain access to a particular role in the role-assumption chain.

The aforementioned challenges, among others, are addressed by embodiments of the techniques described herein, whereby automated techniques may be used to perform symbolic automated reasoning analysis regarding role reachability for an access control system. In particular, an access control analyzer may perform a role reachability analysis to determine whether a particular user or role, under a particular transitive or "sticky" tag state, can gain access to another particular role, possibly through one or more role assumption steps. The role reachability analysis may use a graph having nodes that represent roles and edges that represent role assumption transitions. Role assumption may be conditioned on key-value attributes (tags) for a role session, including transitive tags. Transitive tags (or "sticky" tags) may represent key-value attributes that persist during assumption of a different role. In some circumstances, a state of the tags may change during role assumption. For each node, the analyzer may determine its possible neighbors by observing that the current transitive tag state can only be extended by a set of tags whose keys are either explicitly mentioned and therefore whose associated conditions are known, or by underspecified tags whose values are unrestricted or partially restricted. The analyzer may aggregate one or more boundary conditions for the one or more tags, as indicated by access control policies associated with role assumption steps. Based (at least in part) on performing a role reachability analysis using such a graph, the access control analyzer may identify potentially unexpected configurations in a distributed system.

Nodes corresponding to a first role and a second role may be neighboring or adjacent in the graph such that assumption of the second role from the first role may include only one role assumption step. In determining whether the first role can assume the second role, the role reachability analysis may determine an access control policy that authorizes a complement of an assume role request for the second role. For example, such a policy may permit all actions except for assumption of the second role. The new access control policy may represent a negation of the assume role request and may be referred to as a negated policy. The role reachability analysis may analyze the negated policy authorizing a complement of an assume role request with respect to one or more other access control policies. In some embodiments, the negated policy may be compared to a role assumption policy for the second role for a particular state of the tags. The analysis of the policies may be performed using a policy comparison service that determines whether one access control policy is more permissive, less permissive, equally permissive, or incomparable with respect to another access control policy. Because the space of strings for tags can be unbounded (e.g., due to wildcards), the role reachability analysis may select one or more representative values for one or more key-value tags from a range of potential values (equivalence classes) for the tag(s). The state of the tags may be determined based (at least in part) on the representative value(s). In some embodiments, the negated policy may include the role assumption policy for the second role if and only if there is no context under which assumption of the second role is authorized. In some embodiments, assumption of the second role by the first role may be authorized if and only if the negated policy does not include the role assumption policy for the second role.

As one skilled in the art will appreciate in light of this disclosure, embodiments may be capable of achieving certain technical advantages, including some or all of the following: (1) improving the security of a distributed system by automatically determining whether one role used for access control for a transitive tag state can gain access to another role through role assumption; (2) improving the security of a distributed system by automatically notifying relevant users or accounts when access control policies are found to have the potential for unexpected privilege escalation; and so on.

FIG. 1 illustrates an example system environment for analysis of role reachability with transitive tags, according to some embodiments. In various embodiments, an access control analyzer 100 may use automated techniques to analyze aspects of access control policies 165 and their related roles and to reach conclusions about how roles relate to other roles. The access control analyzer 100 may be implemented in a provider network 190 that provides access to services and resources 170. The provider network 190 may include an access control policy manager 160 that is usable to grant or deny access to the services and resources 170. For example, the policy manager 160 may be used to approve or deny access requests 155 from an entity referred to as a principal 150. The policy manager 160 may use a set of access control policies 165 to determine whether to allow or deny a particular access request. Principals and policies are discussed in greater detail with reference to FIG. 2.

Access control in the provider network 190 may be implemented using concepts of accounts, users within accounts, and federations of accounts from third-party identity providers for authentication of identities. Access control in the provider network 190 may be implemented using concepts of roles, assumption of roles, and a general-purpose policy language to specify which resources and services these identities can access and under which conditions, e.g., using the policies 165. A role may represent an identity with associated permission policies which dictate what the role can and cannot do. In some embodiments, instead of being uniquely associated with one person, a role may be assumable by principals such as users, other roles, services, or resources (e.g., compute instances). These users can be associated with the same account, a different account, a service, or an external identity authenticated by a supported identity provider (e.g., a corporate directory or a Security Assertion Markup Language [SAML] provider). When a role is assumed, the role assumption may provide temporary security credentials for a role session to allow only enough access to perform the required job, rather than providing long-term credentials such as passwords or access keys.

Access control policies 165 and their corresponding roles may be used within a distributed system in which services and resources 170 are potentially accessible via access requests according to the access control policies. For example, the distributed system may represent a multi-tenant provider network 190. Resources accessible via access control policies 165 may include compute instances, storage resources, database resources, networking resources, and so on. Services accessible via access control policies 165 may include software products that perform various tasks in response to requests from clients, including other services. In some embodiments, the services may offer access to the resources. For example, the provider network 190 may offer a virtual computing service that provisions compute instances from pools of available resources and then permits clients to operate those instances. As another example, the provider network 190 may offer a cloud-based storage service that reserves storage resources from pools of available resources and then permits clients to read from and write to those storage resources. Services and resources 170 may include application programming interfaces (APIs) through which other entities may request actions to be performed.

In one embodiment, the access control policy manager 160 associated with the provider network 190 may manage access control policies 165 that dictate which users can access which services and resources and the circumstances under which those users can access the services and resources 170. Access control policies 165 may include or determine permissions or privileges with respect to particular services and resources 170. An owner of a service or resource may grant a user (or user group) access to the service or resource in order for the user to perform one or more actions while ensuring the security of the service or resource. In order to manage user privileges, a service or resource owner may delegate authority to access a given service or resource in a multiplicity of different ways to allow varying levels of access to the resource according to resource access policies. A principal 150 (or set of principals) that are authorized by the delegation of authority to access the given service or resource may be referred to herein as an authorized delegate. An access control policy may be attached to a role managed by the policy manager 160 or another identity and access management service. The role may be associated with one or more users or user groups. For example, the role may be used by a service or application during its execution in the provider network 190. In some embodiments, an access control policy may adhere to the principle of least privilege. A given policy may permit access to one set of the services and resources 170 but not to another set of the services and resources 170.

To arrive at conclusions about the security posture of systems built to execute in a provider network 190 or other distributed environment, the access control analyzer 100 may use automated techniques to answer role reachability questions. The access control analyzer 100 may determine what can a principal do via the transitive closure of role assumption steps. For example, the access control analyzer 100 may determine if role $r_1$ in account $a_1$ could be able to assume role $r_2$ in account $a_2$, which could be able to assume role $r_3$ in account $a_3$. In some circumstances, the role $r_3$ may have permissions to sensitive resources that $a_1$ was not intended to access for reasons of security, privacy, or regulatory compliance. In a provider network 190, these resources may include storage resources, devices such as satellite base stations or microprocessors, or write-access to the very policies that govern access to roles. The access control analyzer 100 may perform a role reachability analysis 120 based (at least in part) on a role reachability graph 110.

In some embodiments, the access control analyzer 100 may include a user interface 130. The user interface 130 may permit users to request that the role reachability analysis 120 be performed, e.g., for a particular role or account or for a set of roles or accounts. The user interface 130 may present aspects of the analysis 120 to users, such as indications of which roles can assume which other roles and/or other results of the analysis. In some embodiments, the user interface 130 may be used to generate notifications regarding output of the analysis 120. For example, the analyzer 100 may send a notification to an administrator or security team of any security findings that are discovered using the role reachability analysis 120, e.g., findings of unexpected privilege escalation. In some embodiments, the access control analyzer 100 may be implemented as a service and may include one or more service interfaces by which the analyzer may interact with other services, e.g., services 170 and/or policy comparison service. In various embodiments, the analyzer 100 may be implemented within the provider network 190 or external to the provider network.

The access control analyzer 100 may perform analysis 120 of role reachability in view of transitive or "sticky" session tags. Tags may represent key-value attributes that are provided during role assumption. Tags may include alphanumeric descriptors that are attached to principals. Policies may constrain these tags to perform attribute-based access control in combination with delegated role-based management, e.g., to apply an authorization strategy that defines permissions based on tag attributes. For example, if an organization uses a SAML-based identity provider, then the organization may configure its assertions to provide session tags to the cloud provider network. When the employees federate into the provider network 190, their attributes such as FirstName, LastName, or Email can be attached to an associated principal in the provider network, and policies can grant or deny access based on these attributes. Session tags may be passed during role assumption steps. Session tags can optionally be set as transitive or "sticky" such that they persist during subsequent role-assumption steps to propagate constraints across a role-assumption chain. When a session tag is set as transitive, it may become a principal tag associated with the session corresponding to the assumed role.

The role reachability analysis 120 may use a role reachability graph 110 having nodes that represent roles and edges that represent role assumption transitions. The graph 110 may be a directed graph (in which edges have directions) but not necessarily a directed acyclic graph. Role assumption may be conditioned on key-value attributes (tags) for a role session, including transitive tags that persist during assumption of a different role. In some circumstances, a state of the tags may change during role assumption. For example, assumption of a particular role may cause tags to be added for a principal, and thus the particular path taken by a role assumption chain may result in a different tag state than another path to the same node in the graph 110. Role assumption may be conditioned on tags that match wildcards for values of key-value attributes. Based (at least in part) on the presence of such wildcards, the set of potential tag values that are relevant to a role assumption step may be unbounded and/or indefinitely large. In some embodiments, for each node, the analyzer 100 may determine its possible neighbors by observing that the current transitive tag state can only be extended by a set of tags whose keys are either explicitly mentioned and therefore whose associated conditions are known, or by underspecified tags whose values are unrestricted or partially restricted. The analyzer 100 may aggregate one or more boundary conditions (e.g., upper bounds and/or lower bounds) for the one or more tags, as indicated by access control policies 165 associated with role assumption steps. Based (at least in part) on performing a role reachability analysis 120 using the graph 110, the access control analyzer 100 may identify a potentially unexpected configuration. The analyzer 100 may present security findings that describe that configuration.

In some embodiments, the access control analyzer 100 may use a policy comparison service 180 in the provider network 190 to find semantic-level differences (if any) between two access control policies. For example, the policy comparison service 180 may determine whether one policy is less-or-equally permissive than another policy. For example, the policy comparison service 180 may be used to determine whether a role assumption step may be performed. The policy comparison service 180 may determine the conditions for performing an assume role step. Use of the policy comparison service 180 is discussed in greater detail below.

Figure 9:
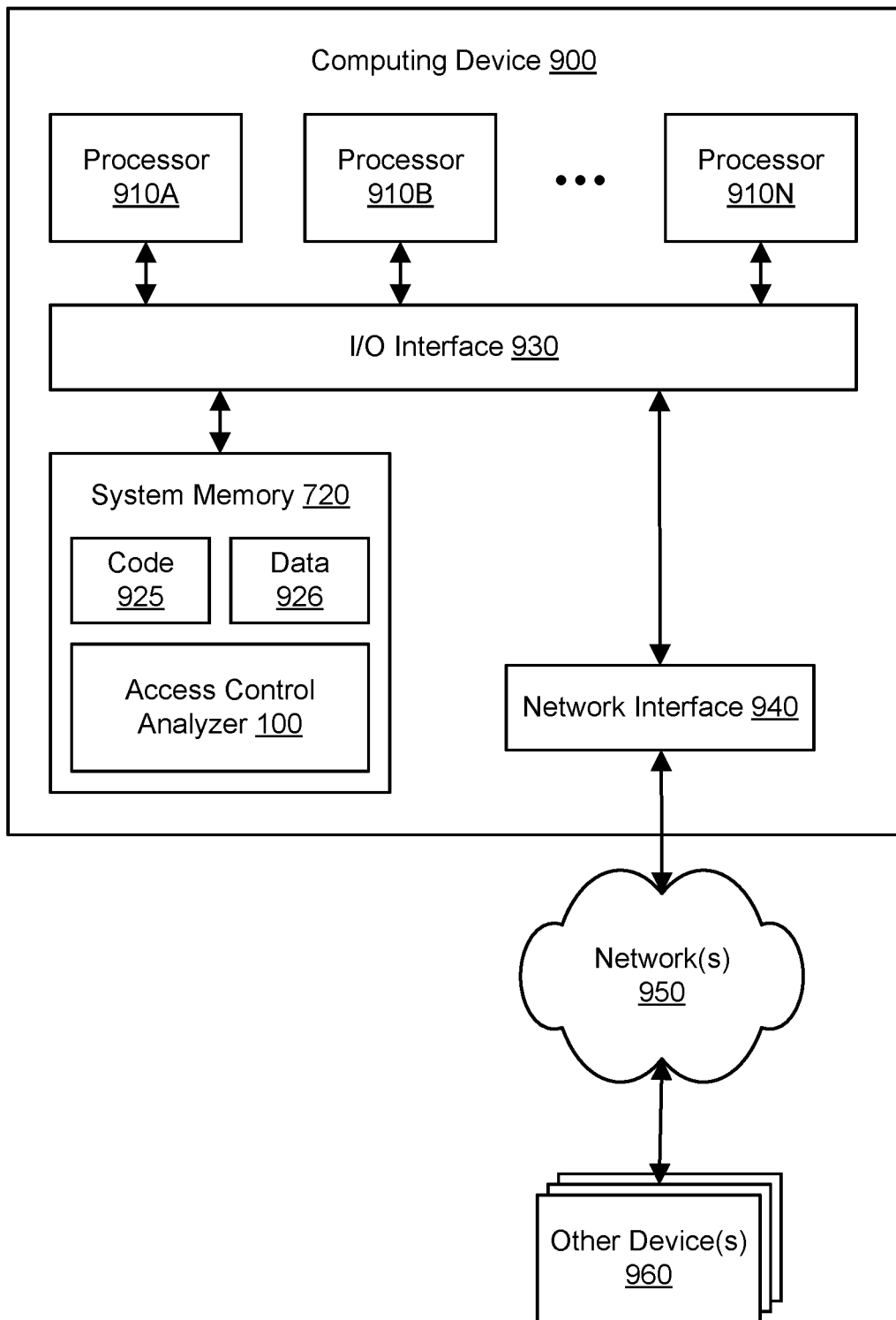
FIG. 9 illustrates an example computing device that may be used in some embodiments.

The access control analyzer 100 may be implemented using any suitable number and configuration of computing devices, any of which may be implemented by the example computing device 900 illustrated in FIG. 9. The computing devices may be located in any suitable number of data centers or geographical locations. In various embodiments, at least some of the functionality of the access control analyzer 100 may be provided by the same computing device or by different computing devices. If any of the components of the access control analyzer 100 are implemented using different computing devices, then the components and their respective computing devices may be communicatively coupled, e.g., via one or more networks. Each of the components of the access control analyzer 100 may represent any combination of software and hardware usable to perform their respective functions, as discussed as follows. Operations implemented by the access control analyzer 100 may be performed automatically, e.g., without a need for user initiation or user intervention after an initial configuration stage, and programmatically, e.g., by execution of program instructions on at least one computing device. It is contemplated that the access control analyzer 100 may include additional components not shown, fewer components than shown, or different combinations, configurations, or quantities of the components shown.

Various components such as the access control analyzer 100, policy manager 160, services and resources 170, and/or policy comparison service 180 may be implemented in a service-oriented system in which multiple services collaborate to perform complex tasks according to a service-oriented architecture. A service (such as one of the services 170) may be implemented using a plurality of different instances that are distributed throughout one or more networks, and each instance may offer access to the functionality of the corresponding service to various clients. In such an environment, the access control analyzer 100 may offer its functionality as service to multiple clients. It is contemplated that any suitable number and configuration of clients may interact with the access control analyzer 100. To enable clients to invoke its functionality, the access control analyzer 100 may expose any suitable interface(s), such as one or more APIs or other programmatic interfaces, command-line interfaces (CLIs), and/or graphical user interfaces (GUIs), e.g., the user interface 130. In one embodiment, the functionality of the access control analyzer 100 may be offered to clients in exchange for fees.

Components shown in FIG. 1 may convey network-based service requests and other data to each other via one or more networks. In various embodiments, the network(s) may encompass any suitable combination of networking hardware and protocols necessary to establish network-based communications, e.g., between components in the provider network 190 and the access control analyzer 100. For example, the network(s) may generally encompass the various telecommunications networks and service providers that collectively implement the Internet. The network(s) may also include private networks such as local area networks (LANs) or wide area networks (WANs) as well as public or private wireless networks. In some embodiments, any of the components shown in FIG. 1 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between one component and the Internet as well as between the Internet and another component. It is noted that in some embodiments, components may communicate using a private network rather than the public Internet.

In one embodiment, the services and resources 170 may be implemented using resources of the provider network 190. In some embodiments, aspects of the access control analyzer 100, policy manager 160, and/or policy comparison service 180 may also be implemented using resources of the provider network 190. The provider network 190 may represent a network set up by an entity such as a business entity or a public-sector organization to provide one or more services (such as various types of network-accessible computing or storage) accessible via the Internet and/or other networks to a distributed set of clients. The provider network 190 may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including computer servers, storage devices, network devices, and the like. Because resources of the provider network 190 may be under the control of multiple clients (or tenants) concurrently or serially, the provider network may be said to offer multi-tenancy and may be termed a multi-tenant provider network. The provider network 190 may be hosted "in the cloud" and may be termed a cloud provider network or cloud-based provider network.

In some embodiments, an operator of the provider network 190 may implement a flexible set of resource reservation, control, and access interfaces for their clients. For example, a resource manager may implement a programmatic resource reservation interface (e.g., via a web site or a set of web pages) that allows clients (potentially including other components within the provider network 190) to learn about, select, purchase access to, and/or reserve compute instances offered by the provider network 190. Such an interface may include capabilities to allow browsing of a resource catalog and provide details and specifications of the different types or sizes of resources supported, the different reservation types or modes supported, pricing models, and so on.

Figure 2:
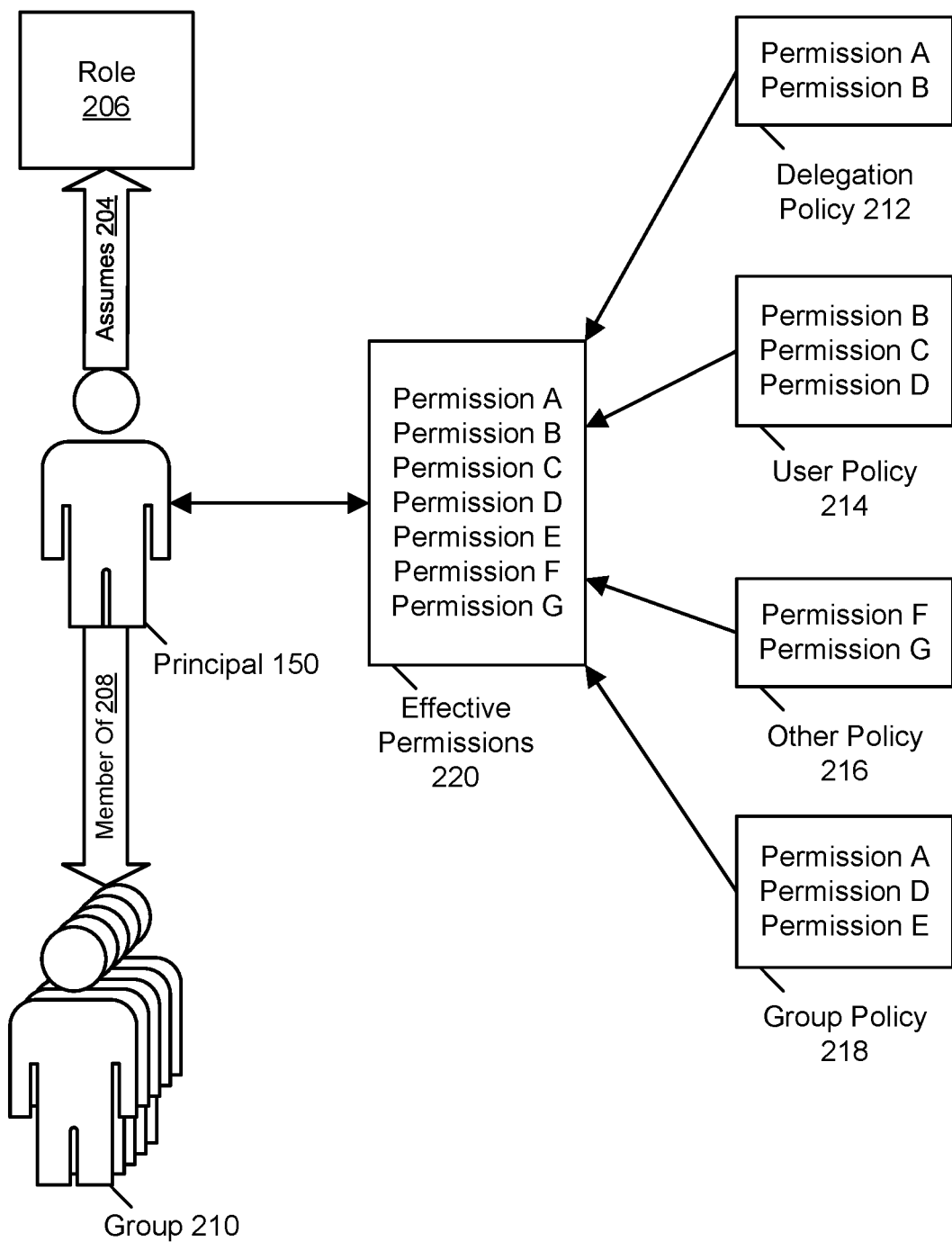
FIG. 2 illustrates an example of a permissions scheme usable for analysis of role reachability with transitive tags, according to some embodiments.

FIG. 2 illustrates an example of a permissions scheme usable for analysis of role reachability with transitive tags, according to some embodiments. A principal 150 may have a set of effective permissions 220 that may be an aggregate of the permissions granted by one or more policies associated with that principal's access to resources. The set of effective permissions 220 may specify a plurality of permissions which detail resources the principal 150 may access, which resources the principal 150 may not access, and under which conditions access to those resources may be allowed (or granted) or denied. For example, a set of effective permissions 220 may include one or more permissions that are associated with the principal 150, and one or more permissions that come from a different source such as, for example, a group policy, a delegation policy, roles assumed by the principal, organizational policies, or default policies. With respect to a policy, the policy's effective permissions may be those permissions that the policy explicitly or implicitly defines. For instance, a policy may explicitly grant a principal a set of permissions to perform a set of actions in connection with a resource. As another example, a policy may implicitly grant permissions to principals by granting permissions to a group (of which the principals are a member). The effective permissions of a policy may change over time. For example, a policy may be a role policy and principals able to assume the role may change over time despite the policy remaining static. As a result, effective permissions may change as the principals authorized to assume the role change. In other words, an effective permission is an access right of a principal to perform an action on a resource. A policy may grant effective permissions explicitly (e.g., by specifying the principal, the action, and the resource) and/or implicitly (e.g., by specifying the permissions in a way that leaves one or more of the principal, action, or resource unspecified explicitly).

In one embodiment, when a default policy is to deny access to resources, the permissions may specify which resources are allowed. In one embodiment, when the default policy is to allow access to resources, the permissions may specify access to the resources which are not explicitly denied. In one embodiment, with some other default policy, the permissions may specify a combination of allowed and denied resource access. In some embodiments, the set of effective permissions 220 may be an aggregation of permissions for a particular resource and/or class of resources. In some embodiments, the set of effective permissions 220 may be an aggregation of permissions for multiple resources (e.g., an aggregation of permissions associated with all resources managed by a service for the user, an aggregation of permissions associated with a user account, or some other aggregation of permissions).

The set of effective permissions 220 may specify a combination or aggregation of permissions based on aspects of the principal. For example, if the principal 150 is a user, then the set of effective permissions 220 may specify one or more user policy permissions 214. User policy permissions 214 may include permissions related to the type of the principal 150 (i.e., a "user," a "group," or an "organization") and may also include permissions associated with a specific set of credentials associated with the identity of the principal 150.

In addition to permissions related to the class and/or the identity of the principal 150, the set of effective permissions 220 may specify one or more delegation policy permissions 212 as a result of the principal 150 assuming 204 one or more roles 206 specified within an organization. As an example, a principal 150 may be a software developer and may assume 204 a software developer role in his or her day-to-day activities and may become an authorized delegate for the set of permissions associated with assuming the software developer role. A software developer role may specify a set of delegation policy permissions 212 that are included in the set of effective permissions 220 associated with the principal 150. There may be some overlap in the user policy permissions 214 and the delegation policy permissions 212 (e.g., "Permission B"). There may also be conflicts between the user policy permissions 214 and the delegation policy permissions 212. For example, "Permission A" in delegation policy permissions 212 may grant access to a resource at all times, while "Permission C" in user policy permissions 214 may deny such access. In the event of such conflicts, a default policy and/or a default policy conflict resolution standard may prevail (i.e., to prefer denial or to prefer granting).

Similarly, the set of effective permissions 220 may specify one or more group policy permissions 218 as a result of a principal 150 being a member of 208 one or more groups 210 (e.g., a production group). The set of effective permissions 220 may also specify one or more other policy permissions 216 such as those associated with default policies, organizational policies, policies associated with certain applications, policies associated with heightened security conditions, temporary polices, or other such policies.

A principal 150 may also assume multiple roles and thus multiple sets of role policy permissions. For example, the principal 150 that assumes a software developer role in his or her day-to-day activities may, at some point during his or her day, need more permissions such as those which may be associated with a system administrator role. In such an example, the principal may temporarily assume a system administrator role, perform one or more privileged operations granted by that role, and then may release that role, thereby returning his or her policy to the less privileged set of permissions. As may be contemplated, the types of roles and the associated permissions described in association with those roles are illustrative examples and other types of roles and associated positions may be considered as within the scope of the present disclosure.

Permissions associated with the set of effective permissions 220 may be altered for the principal 150 by adding and/or removing permissions (e.g., as a result of API calls to a policy management service 160) from the delegation policy permissions 212, from the user policy permissions 214, from the group policy permissions 218, from the other policy permissions 216, or from other such groups of permissions. For example, removing "Permission E" from the set of effective permissions 220 may be accomplished by removing that permission from the group policy permissions 218. Such a removal may also remove that permission from any other principals who are members of that group which may or may not be a desirable effect. Redundant permissions may be removed from a policy. For example, users with user policy permissions 214 and with delegation policy permissions 212 have "Permission B" granted by both policies and as such, "Permission B" may be removed from either delegation policy permissions 212 or user policy permissions 214 without altering the permissions in the set of effective permissions 220. In both of these examples, other policy modification actions may also accomplish the same result (e.g., altering group membership and/or role assignments as described herein).

For example, the principal 150 may be removed from the group (rather than altering the permissions of the group) and, because in the example illustrated in FIG. 2, "Permission A" and "Permission D" are granted by other policy permissions, the result would be to remove "Permission E" from the principal without altering the permissions of other principals. Similarly, permissions for a principal 150 may be altered by adding the principal to a new group with different permissions (i.e., a newly created and/or previously specified group), assuming and/or releasing roles from the principal, altering roles, splitting groups based on the principals and/or the desired permissions, or other such actions. For example, a group may have ten members and may grant five permissions. Five of the group members may be suited to having the first four permissions and five of the group members may be suited to having the last three permissions. Splitting this group into two groups, each of which has the appropriate permissions and then making the appropriate principals members of the appropriate groups may make the permissions more optimal for each of the members.

In an embodiment, a permission may specify a principal 150, a resource, an action, a condition, and/or an effect. In some embodiments, a permission may specify a plurality of one or more of these elements such as, for example, a set or class of users, a collection of resources, several different actions, and/or multiple conditions. The principal 150 may represent a user, a group, an organization, a role, or a collection and/or combination of these or other such entities. A principal 150 may be any entity that is capable of submitting API calls that cause an action associated with a resource to be performed and/or any entity to which permissions associated with a resource may be granted. For example, a particular permission may indicate that the principal 150 is a user identified as "USER1." The permission may indicate that an action that may be performed in association with the resource and may, for example, be identified by a type of API call, a library call, a program, process, series of steps, a workflow, or some other such action. For example, an action may be a set of operations that may be performed as part of the fulfillment of an API call to, for example, a web-accessible service. The actions that are performed may be a subset of those actions and/or may be a single operation. The operations may also be performed in a defined order, may be repeated, or may be shared between a plurality of API calls. For example, the action may be an API call to write data to the resource. A permission may further specify a storage resource, a data write API call for the action, a time condition, and an allow effect. Such an example permission may thus specify that "USER1 is ALLOWED to WRITE to 12345 between 9:00 AND 9:30 AM."

Figure 3:
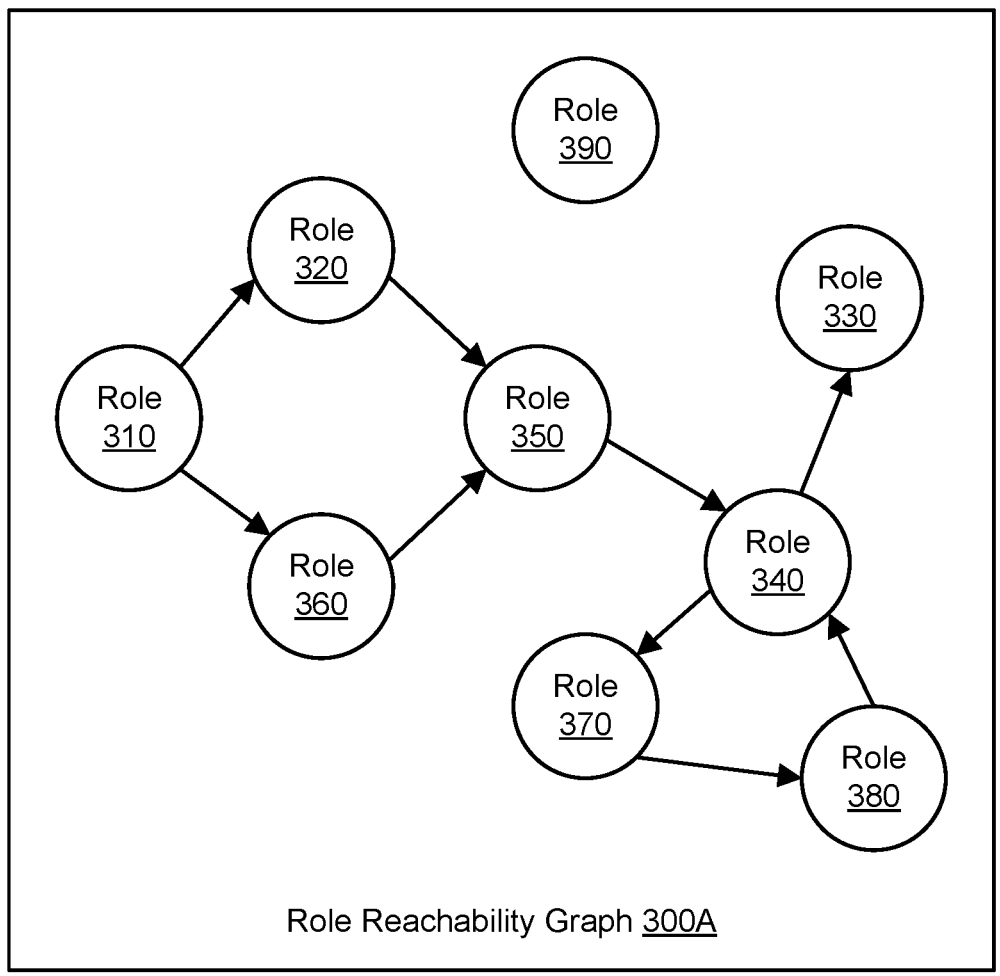
FIG. 3 illustrates an example of a role reachability graph usable for analysis of role reachability with transitive tags, according to some embodiments.

FIG. 3 illustrates an example of a role reachability graph usable for analysis of role reachability with transitive tags, according to some embodiments. As discussed above, a role reachability graph 110 may include nodes that represent roles and edges that represent potential role assumption steps. The example graph 300A shown in FIG. 3 may include nodes representing roles such as role 310, role 320, role 330, role 340, role 350, role 360, role 370, role 380, role 390, and so on. The graph 300A may be a directed graph in which edges have directions such that a directed edge between two nodes indicates that one role can potentially assume another role to which the edge points. For example, the edge between role 310 and role 320 may indicate that the role 310 may potentially assume the role 320. The graph 300A may not necessarily be a directed acyclic graph. For example, a set of role assumption steps may permit a role represented by role 340 to assume a role represented by role 370, the role 370 to assume a role 380, and the role 380 to assume the role 340. In some embodiments, due at least in part to the potentially cyclic nature of the graph 300A and also to the use of string-based tags, the set of potential paths may be unbounded. Some nodes may be unreachable from other nodes. For example, role 390 may be unreachable from role 310-380. In some embodiments, any two roles may belong to different accounts or the same account with the provider network 190. For example, role 310 may belong to a first account, role 370 may belong to a second account, and role 330 may belong to a third account.

Figure 4:
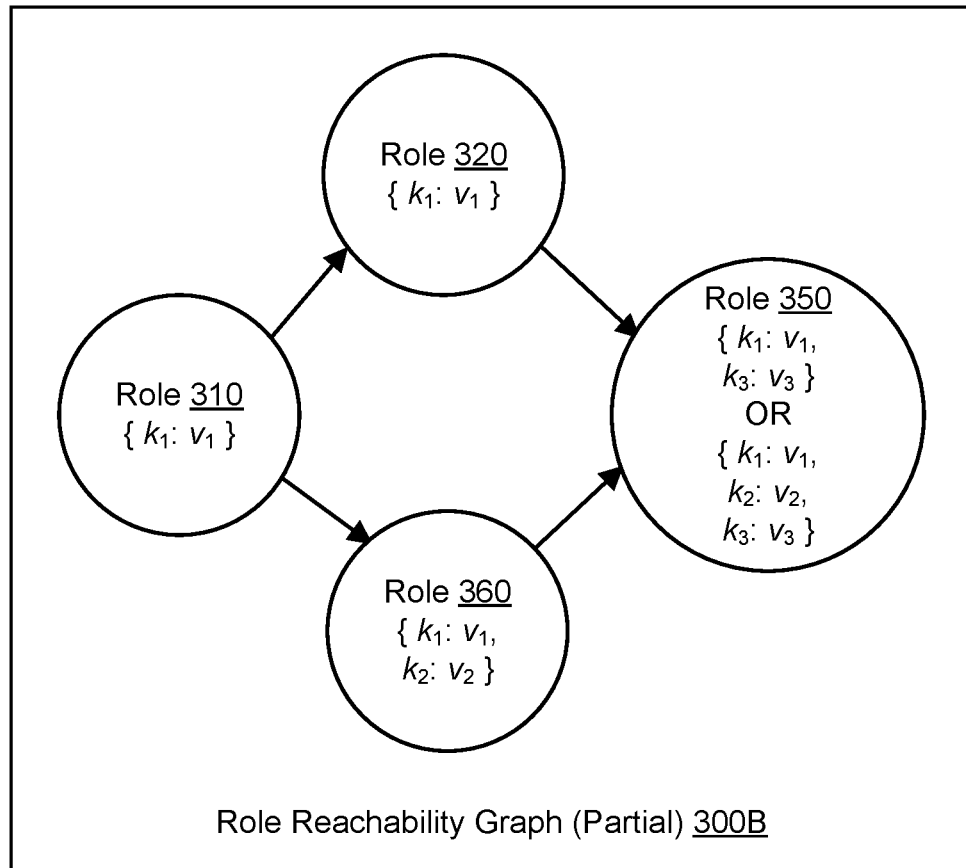
FIG. 4 illustrates an example of role assumption steps with transitive tags, according to some embodiments.

FIG. 4 illustrates an example of role assumption steps with transitive tags, according to some embodiments. The graph 300B shown in FIG. 4 may represent a portion of the example graph 300A discussed above. Role assumption may be conditioned on key-value attributes (tags) for a role session, including transitive tags that persist during assumption of a different role. In some circumstances, a state of the tags may change during role assumption. Assumption of a particular role may cause one or more tags to be added, and thus the particular path taken by a role assumption chain may result in a different tag state than another path to the same node in the graph. For example, the partial graph 300A shows two paths to reach role 350 from role 310, e.g., via intermediate role 320 or intermediate role 360. If role 360 adds a transitive tag to the session during role assumption and role 320 does not, then the tag state at role 350 may vary depending on which path was taken.

The state of any tags for a session may represent an authorization context, and assumption of a role may be conditional on that context. In the example graph 300B of FIG. 4, the session tag state after assuming role 310 may include one key-value tag $\{k_1:v_1\}$. If role 310 assumes role 360, then another key-value tag may be added such that the session tag state includes $\{k_1:v_1, k_2:v_2\}$. However, if role 310 instead assumes role 320, then the tag state may remain the same. If role assumption is performed for role 350, the state of the session tags may vary based (at least in part) on the path that is taken. Assumption of role 350 may also add another key-value tag. For example, assumption of role 350 from role 320 may result in a session tag state that includes $\{k_1:v_1, k_3:v_3\}$, while assumption of role 350 from role 360 may result in a session tag state that includes $\{k_1:v_1, k_2:v_3, k_2:v_3\}$. The ability of role 350 to assume additional roles may then vary based (at least in part) on these differing tag states.

The role reachability analysis 110 may begin traversing the graph at one or more possible entry points, such as nodes lacking a transitive tag state. Role assumption may be conditioned on tags that match wildcards for values of key-value attributes. Based (at least in part) on the presence of such wildcards, the set of potential tag values that are relevant to a role assumption step may be unbounded and/or indefinitely large. In some embodiments, for each node, the analyzer 100 may determine its possible neighbors by observing that the current transitive tag state can only be extended by a set of tags whose keys are either explicitly mentioned and therefore whose associated conditions are known, or by underspecified tags whose values are unrestricted or partially restricted. The analyzer 100 may aggregate one or more boundary conditions (e.g., upper bounds and/or lower bounds) for the one or more tags, as indicated by access control policies 165 associated with role assumption steps.

As demonstrated using the following example, role assumption may lead to unexpected privilege escalation in the presence of subtle transitive tag behavior with potential overlapping string constraints. In a provider network 190, a principal p may assume a role r if role r's trust policy trusts p, and if p's identity policy grants access to an AssumeRole action for the resource r. If p and r are from different accounts, p may be granted access to the AssumeRole action if its identity policy explicitly grants it. If p and r are from the same account, p may have access to the AssumeRole action so long as its identity policy does not explicitly deny it. In this example, the identity policy for a particular user Jane in account 123 may include the following:

```
{
    "Effect": "Deny",
    "Action": "AssumeRole",
    "Resource": "123:role/Write*"
}
```

In this example, the trust policy for a role Audit in account 123 may include the following:

```
{
    "Effect": "Allow",
```

-continued

```
  "Principal": {"ProviderNetwork": "123:user/Jane"},
  "Action": ["AssumeRole", "TagSession"],
  "Condition": {
    "StringLike": {"RequestTag/FirstName": "J*"},
    "ForAllValues:StringEquals": {"TransitiveTagKeys": ["FirstName",
       "Email"]},
    "ForAnyValue:StringEquals": {"TransitiveTagKeys": "FirstName"}
  }
}
```

In this example, the identity policy for the role Audit may include the following:

```
{
  "Effect": "Allow",
  "Action": "AssumeRole",
  "Resource": "321:role/ReadOnly"
}
```

A condition including ForAllValues may test whether the value of every member of the request set is a subset of the condition key set. The condition may return true if every key value in the request matches at least one value in the policy. The condition may also return true if there are no keys in the request or if the key values resolve to a null data set, such as an empty string. A condition including ForAnyValue may test whether at least one member of the set of request values matches at least one member of the set of condition key values. The condition may return true if any one of the key values in the request matches any one of the condition values in the policy. For no matching key or a null dataset, the condition may return false.

According to the example policy fragments shown above, Audit trusts Jane due to its trust policy, and Jane is not explicitly denied access to assume role Audit since Audit does not match the string pattern Write*, as denied by Jane's identity policy. Because Jane's policy does not deny the AssumeRole action and the role's trust policy explicitly allows her access, the AssumeRole operation may be allowed.

In this example, the trust policy for a role ReadOnly in account 321 may include the following:

```
{
  "Effect": "Allow",
  "Principal": {"ProviderNetwork": "role/Audit"},
  "Action": ["AssumeRole", "TagSession"],
  "Condition": {
    "StringLike": {
      "RequestTag/LastName": "D*",
      "PrincipalTag/FirstName": "*an*"
    },
    "ForAllValues:StringEquals": {"TransitiveTagKeys": "LastName"}
  }
}
```

In this example, the identity policy for a role StorageAccess in account 321 may include the following:

```
{
  "Effect": "Allow",
  "Action": "GetObject",
  "Resource": "sensitive-resource/*"
}
```

In this example, the trust policy for the role StorageAccess may include the following:

```
{
  "Effect": "Allow",
  "Principal": {"ProviderNetwork": "role/ReadOnly"},
  "Action": ["AssumeRole", "TagSession"],
  "Condition": {
    "StringEquals": {"RequestTag/Email": "jane@doe.com"},
    "StringLike": {
      "PrincipalTag/LastName": "*oe",
      "PrincipalTag/FirstName": "*e"
    },
    "ForAllValues:StringEquals": {"TransitiveTagKeys": "Email"},
    "ForAnyValues:StringEquals": {"TransitiveTagKeys": "Email"}
  }
}
```

According to the example policy fragments shown above, because Audit's identity policy explicitly grants access to the AssumeRole API on ReadOnly due to identity policy for the role Audit, and because ReadOnly trusts Audit due to the trust policy for the role ReadOnly, the role Audit in account 123 is allowed to assume role ReadOnly in account 321. Meanwhile, StorageAccess trusts ReadOnly in its own account due to trust policy for the role StorageAccess, and therefore ReadOnly can assume role StorageAccess. In some embodiments, however, there are conditions on these role assumption steps expressed as constraints over tags which should have specific values or match the specified criteria. A cloud provider network 190 may expose tags with condition keys prefixed by RequestTag, so a user can refer to the value of the Name tag when authorizing an AssumeRole call by referencing RequestTag/Name. That same tag may become attached to the resulting session as PrincipalTag/Name after a successful call.

In the example, for user Jane to assume role Audit, the user must provide a session tag whose key is FirstName and whose value matches J* (according to the trust policy for the role Audit). At the same time, the trust policy restricts the session tags that can be set as transitive to those with key FirstName or Email, but it requires that there exists at least a transitive tag whose key is FirstName. If the user Jane chooses a value for FirstName that does not match *an*, any attempt to assume role ReadOnly may be denied, since it would violate the condition posed by ReadOnly's trust policy.

In the example, for role Audit to assume role ReadOnly, it must provide a session tag whose key is LastName and whose value matches D*. Even though the policy upper-bounds the transitive tags to those with key LastName, it does not require it to be set as transitive. If the value chosen for LastName does not match *oe and it is set as transitive, any attempt to assume role StorageAccess may be denied because it would violate the condition posed by StorageAccess's trust policy. On the other hand, if LastName is not set as transitive, the session associated with role ReadOnly will not have the principal tag LastName necessary to assume role StorageAccess.

In the example, for role ReadOnly to assume role StorageAccess, it must provide a session tag whose key is Email and whose value is jane@doe.com. In some embodiments, if Jane passed the transitive tag Email while assuming Audit, it would not be possible to pass the session tag Email while assuming StorageAccess because transitive tags cannot be overwritten, and therefore the request would be denied. In some embodiments, the request would be authorized only if the values chosen for FirstName and LastName in the previous role assumption steps match *e and *oe, respectively.

In some embodiments, to provide session tags during a role assumption step, it may be required to have permissions to perform the action TagSession in addition to the action that matches the API operation AssumeRole. Thus the trust policy for the role Audit, the trust policy for the role ReadOnly, the trust policy for the role StorageAccess may grant such access. If the user Jane assumes role Audit providing a transitive tag with key FirstName and value Jane, then assumes role ReadOnly providing a transitive tag with key LastName and value Doe, and then assumes role StorageAccess providing a transitive tag with key Email and value jane@doe.com, then all the role-assumption steps may be authorized. By using the temporary credentials associated with the role StorageAccess, the user Jane may gain access to the resource sensitive-resource/*. Depending on the circumstances, this behavior may or may not be desirable. The access control analyzer 100 may perform analysis of role reachability in view of transitive or "sticky" session tags to find such chains of role assumption steps among a large set of policies and their complex interactions in a provider network 190.

In the provider network 190, a resource may represent the domain of elements that can be created, read, updated, or deleted by users. For example, resources 170 may include users, roles, policies, queues, databases, virtual machines, and so on. In the provider network 190, an action may represent a constant (such as AssumeRole or DeleteObject) that represents an operation that can be performed on a resource. In the provider network 190, a principal may represent an entity that can make a request for an action on a resource. Examples of principals may include accounts, users, roles, services, and so on. A request may be represented by a quadruple (p, a, r, c) such that p is a principal, a is an action, r is a resource and c is a mapping containing additional information. The additional information may relate to the request, the principal, and/or the resource, such as service specific information and tags. The term AUTH may represent a predicate governing whether a principal p is authorized to perform an action a on a resource r under a request context c, such that the request (p, a, r, c) is authorized if and only if AUTH(p, a, r, c) holds. The underlying complexity of authorization in the provider network 190 may be captured using the abstract predicate AUTH.

A role-assumption (or assume-role) transition relation $\rightsquigarrow$ may be defined as follows. A principal p may be authorized to assume role r only if AUTH(p, AssumeRole, r, c) holds for some request context c. However, the condition block of trust policy for the role Audit may require the user Jane to pass the FirstName session tag or the operation will fail. To tag a session, it may be required to have permissions to perform the action TagSession in addition to the action that matches the API operation AssumeRole. In some embodiments, it must also hold that AUTH(p, TagSession, r, c). In some embodiments, both requests must be authorized simultaneously and under the same request context. To determine when it is necessary to provide session tags, the predicate ST may be defined such that ST(p, r) holds if and only if any request context c satisfying AUTH(p, AssumeRole, r, c) contains session tags.

In some embodiments, because the policy language may allow establishment of lower bounds on a set of transitive session tags, roles may be reachable only under a certain state of transitive session tags which affects the authorization output. In some embodiments, a principal p, when the provider network 190 is in state σ (the current state of its users, roles, policies, and so on) and the transitive session tag state is t, can assume role r when introducing the new set of transitive session tags t'\t, when the following role reachability relation holds:

$$(p,t,\sigma) \rightsquigarrow E(r;t',\sigma') \stackrel{def}{=} \exists c. \text{AUTH}_\sigma(p, \text{AssumeRole}, r, c \cup t \cup t')$$

$$\wedge ((t' \neq tVST(p,r)) \Rightarrow \text{AUTH}_\sigma(p, \text{TagSession}, c \cup t \cup t'))$$

$$\wedge t \subseteq t' \wedge (\sigma, \sigma') \in E$$

The term E may characterize the effect of the environment on the provider network states during execution. For example, while p assumes r, the environment could add, update, or delete roles, policies, or resources. In some embodiments, the choice of E may be crucial when considering reachability. In some cases, r may be unreachable from p when the provider network state does not change (e.g., E={(s,s')|s=s'}) but may be reachable if the environment is unrestricted (e.g., E={(s, s')|true}). Because t⊆t', if t'≠t, then t'\t≠∅, and therefore transitive tags may be provided during the transition. In some embodiments, p must be authorized to tag the session. If t'\t=∅ and ¬ST(p, r), then it may not be necessary to check whether p is authorized to tag the session. On the other hand, c∪t∪t' may represent the fact that the request context c is extended with the tags in the current transitive tag state, which are added as principal tags (that is, transitive tags become principal tags associated to the assumed role instance), while the tags in t'\t may be added as request tags. For example, if t={FirstName: Jane} and t'={FirstName: Jane, LastName: Doe}, then c∪t∪t' is c∪{PrincipalTag/FirstName: Jane, RequestTag/LastName: Doe}. In some embodiments, it is a responsibility of the AUTH predicate to check that no request tag corresponds to a transitive tag because transitive tags cannot be overwritten. In some embodiments, a role r may be deemed reachable from a principal p if and only if there exists t, t', σ, σ' such that (p, t, σ) $\rightsquigarrow$ *(r, t', σ').

In some embodiments, the access control analyzer 100 may use a policy comparison service 180 in the provider network 190 to find semantic-level differences between two access control policies. For example, the policy comparison service 180 may determine whether one policy is less-or-equally permissive than another policy. In this context, policies may be interpreted as the set of requests they authorize, and the result of the policy comparison service 180 may refer to set inclusion. For example, a first policy may allow a user u to assume a role r regardless of context, and a second policy may allow the user u to not only assume role r but also assume any role matching the wildcard term r*. The policy comparison service 180 may determine that the second policy is more permissive than the first policy. In some embodiments, the policy comparison service 180 may determine whether one policy is equal to, less than, greater than, or incomparable with respect to a second policy.

In some embodiments, the policy comparison service 180 may be used to determine ST(p, r). For a principal p and a role r, let $\pi_0$ be r's trust policy. Let the negated policy $\pi_1$ authorize a complement or negation of the trust policy $\pi_0$, e.g., by authorizing all requests except those where p performs the action AssumeRole on r and the request context does not contain any session tags. In this example, the negated policy $\pi_1$ may include the following:

```
{
  "Version": [date],
  "Statement": [{
    "Effect": "Deny",
    "Principal": {"ProviderNetwork": "PrincipalIdentifier"},
    "Action": "AssumeRole",
    "Resource": "ResourceIdentifier",
    "Null": {"TagKeys": "true"},
  }, {
    "Effect": "Allow",
    "Principal": "*",
    "Action": "*",
    "Resource": "*"
  }]
}
```

The policy comparison service 180 may determine that $(\pi_1, \pi_0) \not\succeq$ if and only if there exists a request context c such that AUTH(p, AssumeRole, r, c) holds in $\pi_0$ and c does not contain any session tags. The policy comparison service 180 may determine that $(\pi_1, \pi_0) \not\succeq$ if and only if there exists a request that is not authorized by $\pi_1$ and that is authorized by $\pi_0$. Because the only requests that are not authorized by $\pi_1$ are those enabling p to assume role r where the request context does not include any session tags, as imposed by the condition on the key TagKeys, then there exists such a request authorized by $\pi_0$.

In some embodiments, the policy comparison service 180 may be used to determine AUTH. Let p be a principal, let r be a role, and assume that the analyzer 100 seeks to determine whether AUTH(p, AssumeRole, r, c∪t∪t') holds for some request context c where t={FirstName: Jane} and t'={FirstName: Jane, LastName: Doe}. Let $\pi_0$ be a policy that allows every request except those enabling p to assume role r regardless of the context. In this example, the policy $\pi_0$ may include the following:

```
{
  "Version": [date],
  "Statement": [{
    "Effect": "Deny",
    "Principal": {"ProviderNetwork": "PrincipalIdentifier"},
    "Action": "AssumeRole",
    "Resource": "ResourceIdentifier"
  }, {
    "Effect": "Allow",
    "Principal": "*",
    "Action": "*",
    "Resource": "*"
  }]
}
```

On the other hand, let $\pi_1$ be r's assume-role policy extended with statements that deny all requests that do not satisfy the conditions of the above-mentioned tags. In this example, the policy $\pi_1$ may include the following:

```
{
  "Version": [date],
  "Statement": [
    "__Role Assumption Policy Statements__"
    {
      "Effect": "Deny",
      "Principal": "*",
      "Action": "*",
      "Resource": "*",
      "Condition": {
        "StringNotEquals": {
          "PrincipalTag/FirstName": "Jane"
        }
      }
    }, {
      "Effect": "Deny",
      "Principal": "*",
      "Action": "*",
      "Resource": "*",
      "Condition": {
        "StringNotEquals": {
          "PrincipalTag/LastName": "Doe"
        }
      }
    }]
}
```

Additionally, $\pi_1$ may be extended with a statement that denies all requests where the set of transitive tag keys is not exactly LastName as shown in the following:

```
{
  "Effect": "Deny",
  "Principal": "*",
  "Action": "*",
  "Resource": "*",
  "Condition": {
    "ForAnyValue:StringNotEquals": {
      "TransitiveTagKeys": ["LastName"]
    }
  }
}
```

Because the policy comparison service 180 may check for the existence of principal tags satisfying the policy conditions, in some embodiments there cannot be principal tags present other than those in the transitive tag state as shown in the following, such as any principal tag key explicitly mentioned in r's assume-role policy that is not FirstName:

```
{
  "Effect": "Deny",
  "Principal": "*",
  "Action": "*",
  "Resource": "*",
  "Condition": {
    "StringLike": {
      "PrincipalTag/__key__": ["*"]
    }
  }
}
```

The policy comparison service 180 may determine that $(\pi_0, \pi_1) \not\succeq$ if and only if there exists a request context c such that AUTH(p, AssumeRole, r, c∪t∪t') holds where t={FirstName: Jane} and t'={FirstName: Jane, LastName: Doe}. The policy comparison service 180 may determine that $(\pi_0, \pi_1) \not\succeq$ if and only if there exists a request that is not authorized by $\pi_0$ and that is authorized by $\pi_1$. Because the only requests that are not authorized by $\pi_0$ are those enabling p to assume role r, then there exists such a request authorized by $\pi_1$. In some embodiments, any request authorized by in cannot satisfy that PrincipalTag/FirstName is not equal to Jane, nor it can satisfy that RequestTag/LastName is not equal to Doe, otherwise it would have been denied. Similarly, in some embodiments, any request authorized by $\pi_1$ can only contain a single transitive session tag with key LastName and no principal tag key other than FirstName, otherwise it would have been denied. Therefore, there exists a request context c such that AUTH(p, AssumeRole, r, c∪t∪t) holds with respect to r's trust policy.

In some embodiments, the analyzer 100 may also check that p's identity policy grants access to the API operation AssumeRole for the role r, assuming that p and r are from the same account. A similar procedure can be performed when p and r are from different accounts. In some embodiments, it may be sufficient to check that p's identity policy does not explicitly deny access to the AssumeRole operation. Let $\pi_0$ be p's identity policy and $\pi_1$ be p's identity policy extended with a statement that explicitly denies p to assume role r. The policy comparison service 180 may determine that $(\pi_0, \pi_1) \not\succeq$ if and only if p's identity policy does not explicitly deny p to assume role r. In some embodiments, the analyzer 100 may determine AUTH(p, TagSession, r, c∪t∪t') in the same way that AUTH(p, AssumeRole, r, c∪t∪t') was determined.

In some embodiments, the policy comparison service 180 may be used to determine whether multiple conditions simultaneously hold in a transitive tag value where the conditions are expressed in the same language as the provider network policies 165. To avoid having to translate the policy language into the language of a Satisfiability Modulo Theories (SMT) solver, the policy comparison service 180 may be used to check for satisfiability. For example, the policy comparison service 180 may be used to determine whether there exists a value for the session tag FirstName that simultaneously satisfies "StringLike": "Ja*" and "StringLike": "*ne". Let $\pi_0$ be a policy that denies every request, and consider the policy $\pi_1$ allowing every request except those where the value of the request tag FirstName does not match "Ja*" or does not match "*ne". The policy comparison service 180 may determine that $(\pi_0, \pi_1) = \prec$ if and only if there exists a value for the session tag FirstName that simultaneously satisfies "StringLike": "Ja*" and "StringLike": "*ne". Since $\pi_0$ denies all requests, then $\pi_0 \leq \pi_1$. Thus $\pi_0 < \pi_1$ if and only if $\pi_1$ authorizes at least one request. In some embodiments, any request authorized by $\pi_1$ cannot satisfy that the value of FirstName does not match Ja*. Therefore, FirstName matches Ja* and FirstName must match *ne.

In some embodiments, the analyzer 100 may perform analysis 120 of a role reachability problem under a particular state of transitive session tags within a provider network account where the environment does not change (e.g., E={(s,s')|s=s'}). In some embodiments, the analyzer 100 may monitor the calls to APIs in the provider network 190 that might change the state of environment (e.g., for a particular account), and the analyzer 100 may restart the analysis 120 upon completion if the state of the environment has changed. Given a provider network account with state G, the analyzer 100 may determine its role reachability graph 110 whose nodes are the pairs (p, t), where p is a principal and t is a transitive tag state, and where there exists an edge from (p, t) to (r, t') if and only if (p, t, σ) ⟿ (r, t', σ). The term a may be constant in the analysis. Let the policy $\pi_1$ include the following:

```
[
  {
    "Effect": "Deny",
    "Action": "*",
    "Principal": "*",
    "Resource": "*",
    "Condition": {"StringNotLike":
      {"RequestTag/FirstName": "Ja*"}
    }
  }, {
    "Effect": "Deny",
```
```
    "Action": "*",
    "Principal": "*",
    "Resource": "*",
    "Condition": {"StringNotLike":
      {"RequestTag/FirstName": "*ne"}
    }
  }, {
    "Effect": "Allow",
    "Action": "*",
    "Principal": "*",
    "Resource": "*",
  }
]
```

Where there is an edge from (Jane, ø) to (Audit, {"FirstName": s}) for any string s matching J*, the role reachability graph may contain an unbounded number of nodes. To reason about role reachability, however, the analyzer 100 need not necessarily know the concrete value that a tag adopts during a role assumption step. Instead, the analyzer 100 may determine the properties that characterize the tag, e.g., that it matches J*. Such an observation may allow the analyzer 100 to characterize, for each role assumption step, all the possible ways in which the transitive tag state can be extended. By abstracting the tag values, the analyzer 100 may convert the unbounded role reachability graph into a finite abstraction.

Let (p, t) and (r, t') be nodes such that (p, t) ⟿ (r, t'). Therefore t⊆t', and each tag in t'\t may represent a session tag provided during the role assumption step that is set as transitive or "sticky." As a consequence, if S is the set of all session tags that can be passed when p assumes r, then t'\t⊆S. In some embodiments, S may be determined by statically analyzing the policies. To determine the possible keys of a tag in S, observe that the policy language may allow establishing bounds on the set of keys passed along a request by defining conditions on the key TagKeys. Because a request may contain multiple tag key-value pairs, TagKeys may be a multi-valued variable and may thereby be constrained through the ForAllValues and ForAnyValue set operators together with one of the available string operators (e.g., StringEquals, StringLike, and so on). For example, the following policy fragment may ensure that a set of session tags satisfies the bounds so long its keys K satisfy {Email}⊆K⊆{FirstName, LastName, Email}:

```
{
  "ForAllValues:StringEquals": {
    "TagKeys": ["FirstName", "LastName", "Email"]
  },
  "ForAnyValue:StringEquals": {
    "TagKeys": ["Email"]
  }
}
```

Because these conditions can be absent or can allow an infinite number of different keys (e.g., when using regular expressions), the analyzer 100 may determine an upper-bound for S. In some embodiments, S can be split into two sets: (i) those tags whose keys are explicitly mentioned in some policy, and (ii) those tags whose keys are not explicitly mentioned in any policy. In some embodiments, the tag keys in the latter set would never match a principal tag key, nor can they have conflicting conditions, otherwise they would be mentioned in the corresponding policy. Therefore, these under-specified tags may be deemed irrelevant to the role reachability analysis. In some embodiments, such a tag can only serve the purpose of satisfying the lower-bound conditions on a policy enabling the transition. By only considering tags whose keys are explicitly mentioned in some policy, the analyzer 100 may implement primary aspects of the role reachability problem: identifying session tags that can later serve as principal tags and also reasoning about conflicting conditions.

In some embodiments, to determine all the possible keys in t'\t, the analyzer 100 may begin by considering the set S of all explicitly mentioned tag keys across all assume-role policies which can be obtained by parsing all the occurrences of the following syntactic pattern, where tag key is either prefixed by RequestTag or PrincipalTag:

```
{
    "Condition": {
        "__string_operator__": {
            "__tag_key__": "__val__"
        }
    }
}
```

In some embodiments, S may be refined by applying the upper-bound conditions obtained by scanning the assume-role policy enabling the transition for the following syntactic patterns:

```
{
    "Condition": {
        "ForAllValues: __string_operator__": {
            "RequestTag": "__val__"
        }
    }
    "Condition": {
        "ForAnyValues: __string_operator__": {
            "RequestTag": "__val__"
        }
    }
}
```

In some embodiments, once S has been determined, any S'⊆S may be a valid candidate to be the set of transitive session tag keys provided during the current role-assumption step, so long it satisfies the lower bound conditions extracted by parsing the ForAnyValues syntactic pattern shown above. Once the keys have been determined, their values may be characterized. To do so, the analyzer 100 may leverage the policy language in which the properties are stated: e.g., if a tag key is not mentioned in the policy enabling the current transition, then its value is unrestricted or partially restricted (e.g., represented by the condition StringLike: *), while if a tag key is mentioned, all the corresponding conditions may be aggregated and associated to the tag key.

For example, the following policy fragment may allow the sets of session tags {"FirstName": {"StringLike": "J*"}, "LastName": {"StringLike": "D*"}} and {"FirstName": {"StringLike": "J*"}, "LastName": {"StringLike": "D*"}, "Email": {"StringLike": "*"}}, because FirstName and LastName must be present satisfying the associated conditions, while Email may be optional and unrestricted:

```
{
    "Effect": "Allow",
    "Action": "AssumeRole",
    "Principal": {"ProviderNetwork": "role/p"},
    "Condition": {
        "StringLike": {
            "RequestTag/FirstName": "J*",
            "RequestTag/LastName": "D*",
        },
        "ForAllValues:StringEquals": {"aws:TagKeys": ["FirstName", "LastName", "Email"]},
        "ForAnyValue:StringEquals": {"aws:TagKeys": ["FirstName", "LastName"]}
    }
}
```

In some embodiments, because finitely many tags can be mentioned, each candidate set of session tags may contain finitely many keys with finitely many associated conditions each. While checking that the proposed set of session tags satisfies all the conditions posed by the policy enabling the transition, the analyzer 100 may verify that it can be extended by a set of under-specified tags to satisfy the lower bound conditions. In this manner, the analyzer 100 may perform an over-approximation as opposed to an exact reachability analysis.

Figure 5:
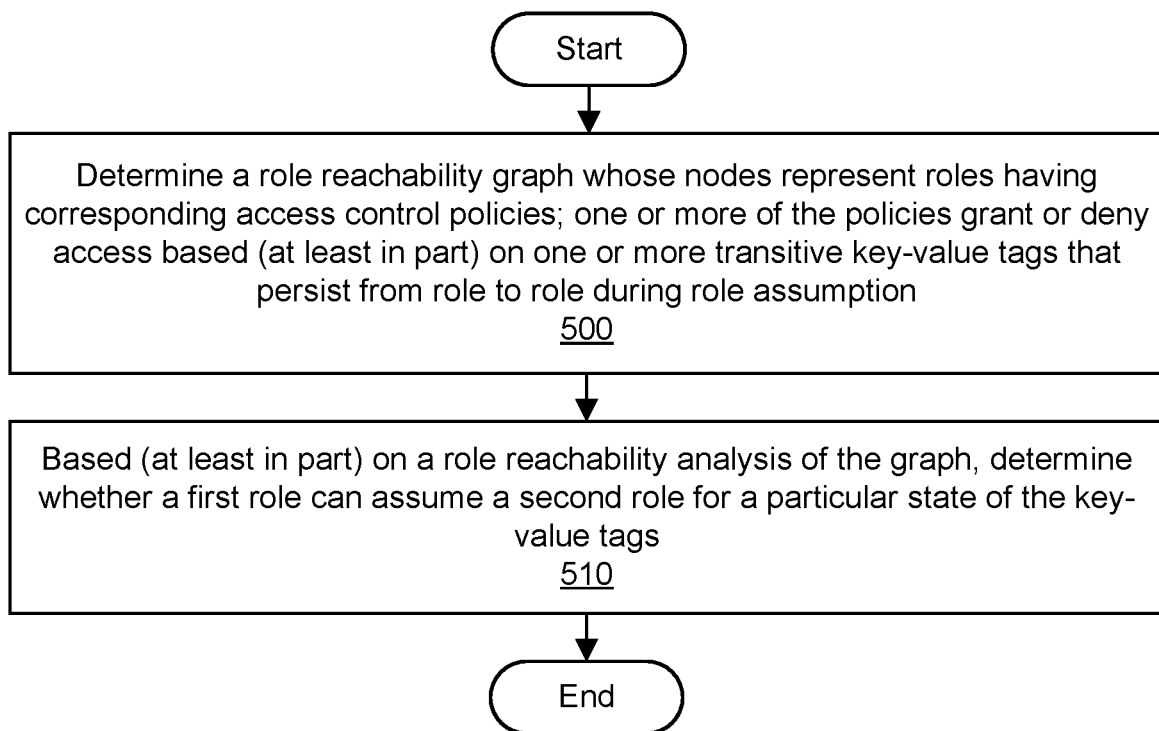
FIG. 5 is a flowchart illustrating a method for analysis of role reachability with transitive tags, according to some embodiments.

FIG. 5 is a flowchart illustrating a method for analysis of role reachability with transitive tags, according to some embodiments. As shown in 500, the access control analyzer 100 may determine a graph comprising a plurality of nodes and one or more directed edges. The nodes may represent a plurality of roles in a provider network that hosts a plurality of services and/or resources. The nodes may include a first node representing a first role and a second node representing a second role. The roles may be associated with a plurality of access control policies granting or denying access to individual ones of the plurality of services and resources. One or more of the access control policies may grant or deny access based at least in part on one or more key-value tags, e.g., where tags for a session match one or more conditions for role assumption. Some role assumption steps may be conditioned on tags that match wildcards for values of key-value attributes. Based (at least in part) on the presence of such wildcards and on the unbounded length of strings, the set of potential tag values that are relevant to a role assumption step may be unbounded and/or indefinitely large.

To perform a role reachability analysis, the analyzer 100 may limit the set of keys to be considered when determining whether a role assumption step can be performed. In some embodiments, for each node, the analyzer 100 may determine its possible neighbors by observing that the current transitive tag state can only be extended by a set of tags whose keys are either explicitly mentioned and therefore whose associated conditions are known, or by underspecified tags whose values are unrestricted or partially restricted (e.g., with wildcards). The analyzer 100 may aggregate one or more boundary conditions (e.g., upper bounds and/or lower bounds) for the one or more tags, as indicated by access control policies 165 associated with role assumption steps. To reason about role reachability, the analyzer 100 need not necessarily know the concrete value that a tag adopts during a role assumption step. Instead, the analyzer 100 may determine the properties that characterize the tag, e.g., that it matches J*. Such an observation may allow the analyzer 100 to characterize, for each role assumption step, all the possible ways in which the transitive tag state can be extended. By abstracting the tag values, the analyzer 100 may convert the unbounded role reachability graph into a finite abstraction that eliminates the potentially unbounded nature of paths and/or tag states.

As shown in 510, the analyzer 100 may determine, based (at least in part) on a role reachability analysis of the graph, whether the first role can assume the second role using one or more role assumption steps for a particular state of the one or more key-value tags. In performing the role reachability analysis, the analyzer 100 may consider, as entry points to a role assumption chain, nodes where the transitive tag state is empty. An individual one of the role assumption steps may provide temporary access during a role session. The one or more key-value tags may include one or more transitive tags that persist during the one or more role assumption steps. The set of all session tags that can be passed when a principal assumes a role may be determined by statically analyzing the policies. To determine the possible keys of a tag in the set, observe that the policy language may allow establishing bounds on the set of keys passed along a request by defining conditions on the key TagKeys. Because a request may contain multiple tag key-value pairs, TagKeys may be a multi-valued variable and may thereby be constrained through the ForAllValues and ForAnyValue set operators together with one of the available string operators (e.g., StringEquals, StringLike, and so on).

Because these conditions can be absent or can allow an infinite number of different keys (e.g., when using regular expressions), the analyzer 100 may determine an upper-bound for the set of all session tags. In some embodiments, the set of all session tags can be split into two sets: (i) those tags whose keys are explicitly mentioned in some policy, and (ii) those tags whose keys are not explicitly mentioned in any policy. In some embodiments, the tag keys in the latter set would never match a principal tag key, nor can they have conflicting conditions, otherwise they would be mentioned in the corresponding policy. Therefore, these under-specified tags may be deemed irrelevant to a role reachability analysis. In some embodiments, such a tag can only serve the purpose of satisfying the lower-bound conditions on a policy enabling the transition. By only considering tags whose keys are explicitly mentioned in some policy, the analyzer 100 may identify session tags that can later serve as principal tags and also reason about conflicting conditions.

Figure 6:
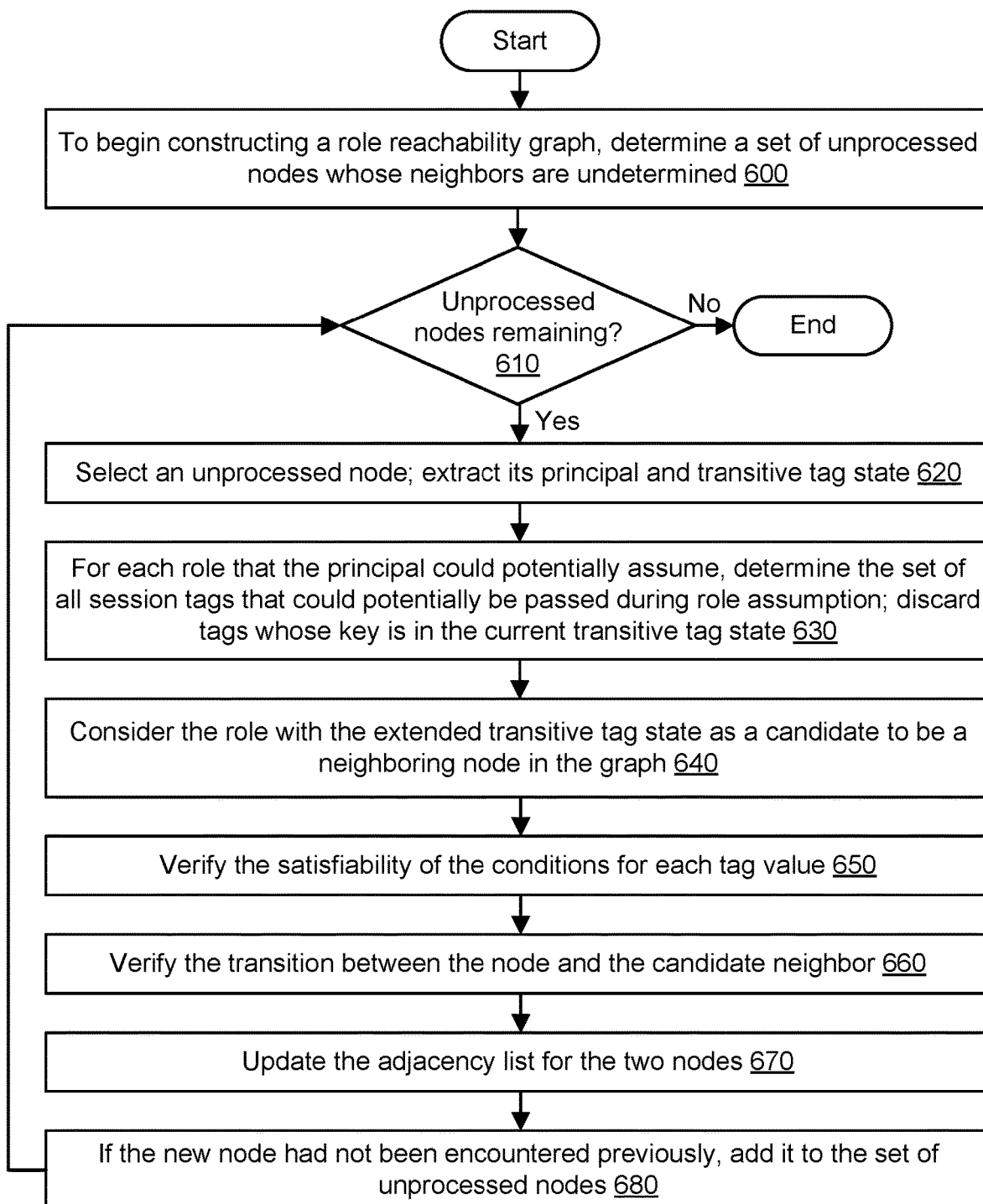
FIG. 6 is a flowchart illustrating further aspects of the method for analysis of role reachability with transitive tags, according to some embodiments.

FIG. 6 is a flowchart illustrating further aspects of the method for analysis of role reachability with transitive tags, according to some embodiments. The analyzer 100 may implement a method that, given the set of users and roles, construct its role reachability graph and returns its adjacency list representation. An adjacency list may indicate, for a particular node, what the node's neighbors are. As shown in 600, the method may start by defining a set q that contains all nodes that are yet to be processed, e.g., nodes whose possible neighbors and outgoing edges are to be determined. Therefore, q may be extended with all pairs of the form (p,ø), where p is a user or a role. As shown in 610 and 620, while there are nodes yet to be processed, the analyzer 100 may pick a node and extracts its principal p and its transitive tag state. In some embodiments, the order in which the nodes are chosen may be irrelevant. If there are no unprocessed nodes, the method may end.

The analyzer 100 may limit the consideration of roles to a finite set and may consider only finite paths. As shown in 630, the analyzer 100 may consider each role r which p could potentially assume. A "candidates" function may return the set of all session tags that could potentially be passed during the role assumption from p to r with its associated conditions, as described previously. Because any subset of the set of session tags may be a candidate to be the set of transitive tags provided during the current step, the analyzer 100 may iterate over them and discard tags whose key is in the current transitive tag state, because transitive tags cannot be overwritten. Once the keys have been determined, their values may be characterized by leveraging the policy language in which the properties are stated: e.g., if a tag key is not mentioned in the policy enabling the current transition, then its value is unrestricted or partially restricted (e.g., represented by the condition StringLike: *), while if a tag key is mentioned, all the corresponding conditions may be aggregated and associated to the tag key. While checking that the proposed set of session tags satisfies all the conditions posed by the policy enabling the transition, the analyzer 100 may verify that it can be extended by a set of under-specified tags to satisfy the lower bound conditions.

As shown in 640, the analyzer 100 may consider the role r together with the extended transitive tag state as a candidate to be a neighboring node in the role reachability graph. In some embodiments, the properties characterizing the values of the tags in the transitive tag state must be updated to reflect the conditions they must satisfy during the current step, e.g., posed on the principal tags by the enabling statement. As shown in 650, the analyzer 100 may verify that the conditions characterizing each tag value are actually satisfiable, otherwise the candidate node wouldn't exist. Such a circumstance might occur as a consequence of contradicting conditions on the key at different stages of a role assumption chain. Additionally, as shown in 660, the analyzer 100 may verify that the transition between the considered nodes hold. If the transition holds, then as shown in 670, the analyzer 100 may update the adjacency list. Finally, as shown in 680, if the new node has not been seen yet, the analyzer 100 may add it to the list of nodes to be processed and may indicate that the node has already been introduced to the graph. As discussed above, the graph may include cyclical portions in which traversal of the graph may visit the same node more than once. In constructing the graph, the analyzer 100 may not visit the same node twice because no additional permissions are necessarily added by subsequent visits.

In some embodiments, the role reachability analysis may not consider the entire history of conditions on tags when transitioning for role assumption. In some embodiments, the role reachability analysis may consider a broader history of conditions on tags, e.g., to consider the last N steps as history. In some embodiments, the role reachability analysis may enumerate a broader set of paths. For example, the role reachability analysis may use a path merging technique to encode an exponential number of paths. By considering a broader tag history and/or set of paths, the analysis may consume more computational resources but may also achieve greater accuracy.

Figure 7:
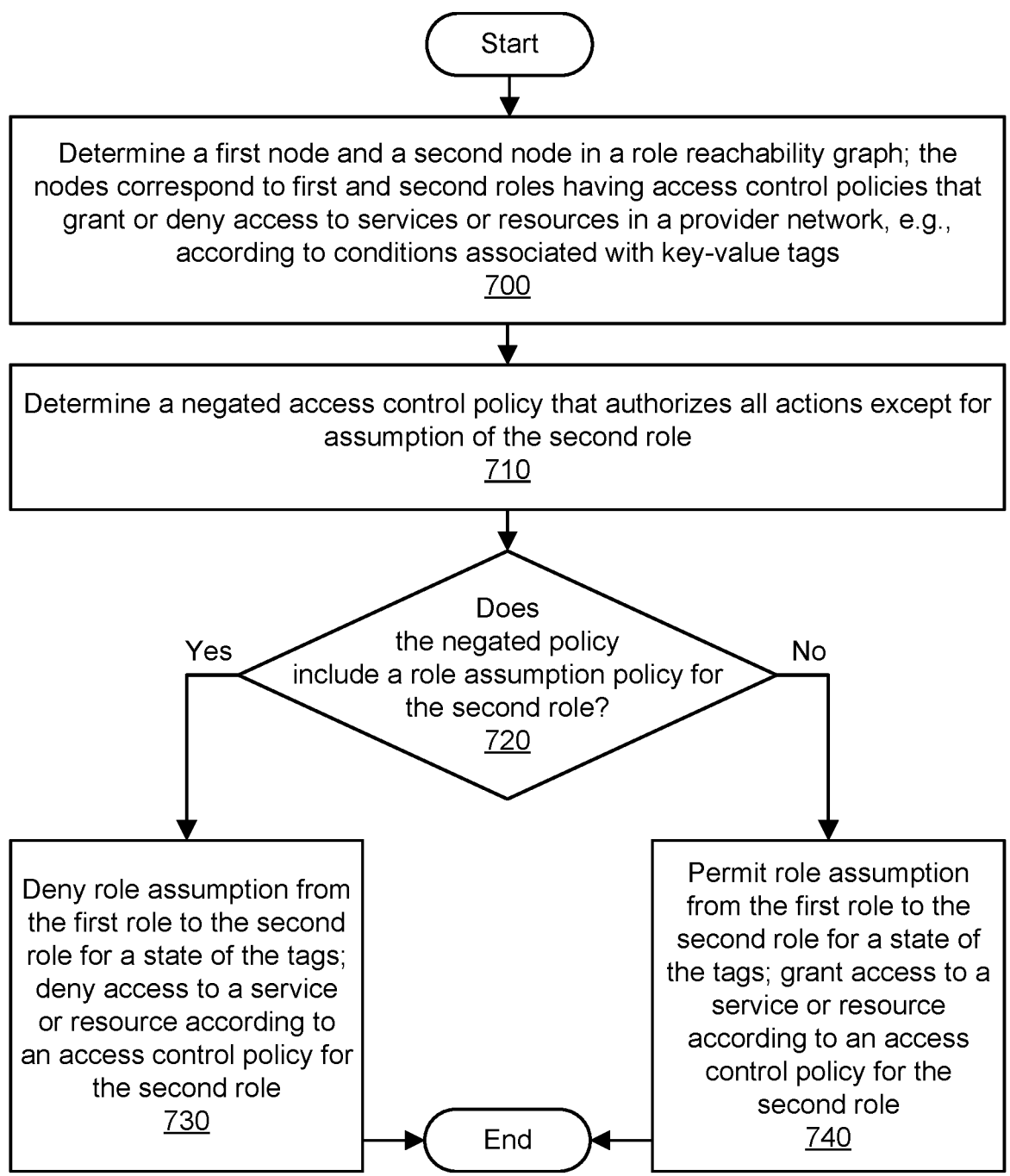
FIG. 7 is a flowchart illustrating a method for analysis of role reachability using policy complements, according to some embodiments.

FIG. 7 is a flowchart illustrating a method for analysis of role reachability using policy complements, according to some embodiments. As shown in 700, a first node and a second node may be determined in a graph. The first node may correspond to a first role in a provider network hosting a plurality of services and resources. The first role may be associated with a first access control policy that grants or denies access to a first service or resource. The second node may correspond to a second role in the provider network. The second role may be associated with a second access control policy that grants or denies access to a second service or resource based at least in part on one or more conditions. The first node and the second node may potentially share a common edge such that role assumption may be performed from the first role to the second role without assuming any intermediate roles. A role reachability analysis may be initiated to determine whether the first role can assume the second role for a particular state of one or more key-value tags.

As shown in 710, the role reachability analysis may determine a third access control policy that authorizes a complement of a role assumption request for the second role. The third access control policy may permit all actions except for assumption of the second role. The third access control policy may represent a policy complement with respect to the role assumption request for the second role. The third access control policy may represent a negation of a role assumption action by a principal in the first role. The third access control policy may be referred to as a negated access control policy.

As shown in 720, the role reachability analysis may perform an analysis of the third (negated) access control policy with respect to a role assumption policy for the second role for the particular state of the one or more tags. In some embodiments, the role assumption policy for the second role may be extended, e.g., with statements that deny all requests that do not satisfy the conditions of one or more tags. The analysis may be performed using a policy comparison service that determines whether one access control policy is more permissive, less permissive, equally permissive, or incomparable with respect to another access control policy. Because the space of strings for tags may be unbounded (e.g., due to wildcards), the analyzer may select one or more representative values for one or more key-value tags from a range of potential values (an equivalence class) for the tag(s). The state of the one or more tags may be determined using these representative values.

In some embodiments, the third access control policy (specifying the complement of the role assumption action) may include the extended role assumption policy for the second role if and only if there is no context under which assumption of the second role is authorized. In some embodiments, assumption of the second role by the first role may be authorized if and only if the third access control policy (specifying the complement of the role assumption action) does not include the extended role assumption policy for the second role. If the third access control policy does include the extended role assumption policy for the second role, then as shown in 730, access to the second service or resource may be denied to a principal in the first role. If third access control policy does not include the extended role assumption policy for the second role, then as shown in 740, access to the second service or resource may be granted to a principal in the first role.

Figure 8:
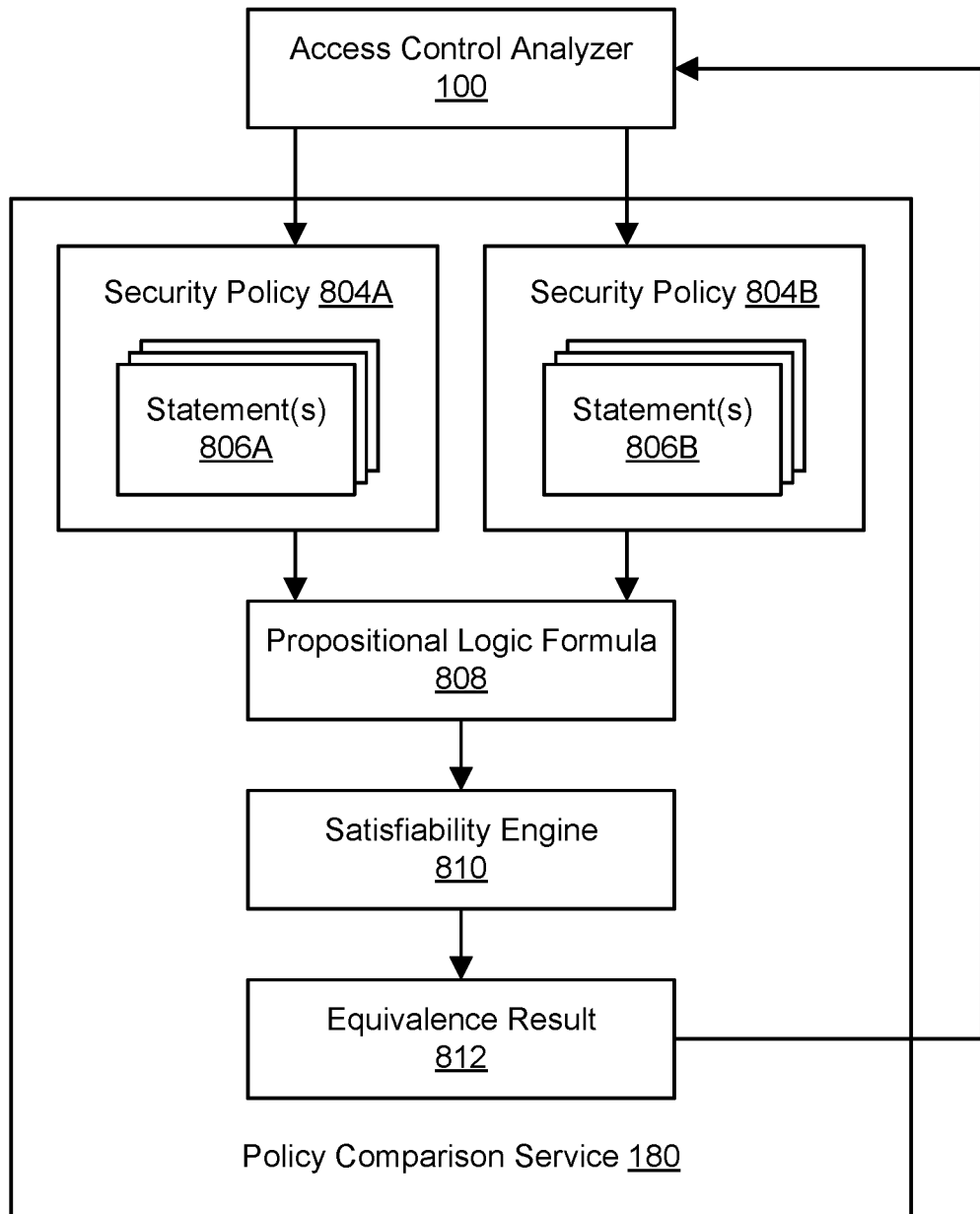
FIG. 8 illustrates further aspects of the example system environment for analysis of role reachability with transitive tags, including an equivalence result generated in response to a request to analyze the equivalency of two security policies, according to some embodiments.

FIG. 8 illustrates further aspects of the example system environment for analysis of role reachability with transitive tags, including an equivalence result generated in response to a request to analyze the equivalency of two security policies, according to some embodiments. As discussed above, the policy comparison service 180 may be used to analyze the equivalency of two access control (security) policies in response to a client request. A client of the policy comparison service 180, such as the analyzer 100, may make an API request to the policy comparison service that includes two or more security policies. A security policy may represent information (e.g., encoded in a file) that specifies one or more security permissions. Security permissions may be elements of the security policy that define access rights associated with resources and/or principals of a system. For example, a permission may be used to grant or deny access to computing resources of a computing resource service provider, e.g., the provider network 190. Policies may be expressed in a language-independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. A security policy may include one or more permission statements as well as additional information such as versioning information and policy-wide information. In some cases, policy-wide information may be included in a policy header at the beginning of a policy or may even be stored separately from (and in association with) a policy document. A policy may include multiple policy statements.

In some embodiments, permissiveness is used to describe the grant of access to resources. For example, if a first policy grants access to a first computing resource (e.g., resource "A"), and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access. Two policies may be equivalent if they both grant access to the same resources and deny (either implicitly or explicitly) access to the same resources. In some cases, equivalency may refer to two policies explicitly granting access to the same resources and explicitly denying access to the same resources, e.g., a first policy that explicitly denies access to a computing resource and a second policy that implicitly denies access to a computing resource (e.g., by not affirmatively granting access in a deny-by-default context) may lack equivalency in some embodiments. Generally speaking, if two policies are not equivalent, they may be said to lack equivalency. In some cases, if a first policy grants access to a first computing resource "A" and a second computing resource "B" and a second policy grants access to the second computing resource "B" and a third computing resource "C", then the polices may be said to be incomparable. It should be noted that unless otherwise specified, examples described herein may implement a deny-by-default security model in which access to a computing resource is denied unless there exists an explicit grant of access to the computing resource. It should furthermore be noted that in the context of these discussions, security policies may be utilized to grant or deny access to resources in the context of a computing resource service provider where a request to access resources may be evaluated by an authorization module or authorization service by utilizing a security policy applicable to the request. An applicable security policy may be a security policy associated with the requestor, a security policy associated with a token that the requestor presents, and so on.

The policy comparison service 180 may include various components and/or modules such as a policy parser, a propositional logic translator, and a satisfiability engine. The policy parser may be a component or module that receives a security policy (e.g., a security policy received from a client in connection with an API call or obtained via a policy management service) and obtains one or more permission statements from the policy. For example, if the client provides a first policy "A" and a second policy "B" to the policy comparison service 180, then the policy comparison service may use the policy parser to obtain a first set of permission statement from policy "A" and a second set of permission statement from policy "B." The permission statements may each be associated with the granting or denying access to computing resource. The permission statements may be in a particular format such as JSON, Aspen, and more.

As described herein, propositional logic may refer to a symbolic logic that relates to the evaluation of propositions that may evaluate to either being true or false. Propositional logic may be utilized to evaluate the logical equivalence of propositional formulas. A propositional formula may be a statement in accordance with a syntax that includes propositional variables and logical connectives that connect the propositional variables. Examples of logical connectives or logical operators may include: "AND" (conjunction), "OR" (disjunction), "NOT" (negation), and "IF AND ONLY IF" (biconditional) connectives. Propositional logic may also be described herein as a "propositional expression" or a "propositional logic expression." In some embodiments, first-order logic may be utilized in place of propositional logic. First-order logic may refer to a formal system that utilizes quantifiers in addition to propositional logic. Examples of quantifiers include "FOR ALL" (universal quantifier) and "THERE EXISTS" (existential quantifier). Unless explicitly noted, embodiments of this disclosure described in connection with propositional logic may also be implemented using first-order logic. For example, in some embodiments, a first-order logic translator may be utilized in place of a propositional logic translator to translate permission statements to first-order logic expressions, and a satisfiability engine may evaluate one or more first-order logic expressions to determine whether the expressions are equivalent.

Permission statements (e.g., those obtained by the policy parser) may be provided to a propositional logic translator. A propositional logic translator may receive a permission statement (e.g., in JSON format) and convert the permission statement into one or more constraints described using propositional logic. The constraints may be described in various formats and in accordance with various standards such as SMT-LIB standard formats, CVC language, and Center for Discrete Mathematics and Theoretical Computer Science (DIMACS) formats. The propositional logic expressions generated by the propositional logic translator may represent a set of constraints that must be satisfied for the corresponding permission statement to be in effect. The constraints may be necessarily satisfied if the preceding permission statement allowing access to APIs starting with "put" (e.g., "put-object") to be fulfilled.

In some embodiments, the analyzer 100 may transmit a web-based API request to the policy comparison service 180 requesting that the policy comparison service determine whether a first security policy (e.g., "Security Policy A") is more permissive than the second security policy (e.g., "Security Policy B"). The security policies may be encoded in the web API request. or information usable to obtain the security policies (e.g., a pointer or a URI indicating the location where a policy may be obtained) may be provided. The policy comparison service 180 may obtain the security policies (e.g., either directly from the request or via a policy management service using a URI encoded in the request) and utilize a policy parser to obtain a first set of permission statements from the first policy and a second set of permission statement from the second policy. The policy statements may be provided to a propositional logic translator to obtain a set of propositional logic expressions that correspond to constraints that must be satisfied for the corresponding policy statement to be in effect. A first propositional logic expression may be generated from the first set of policy statements and a second propositional logic expression may be generated from the second set of policy statements. The propositional logic expressions may be expressed in a language in accordance with a SMT-LIB standard language such as the STM-LIB 2.0 standard. A satisfiability engine may be used to compare the first propositional logic expression and the second propositional logic expression to determine whether one propositional logic is more permissive than the other.

A satisfiability engine may be used to analyze the permissiveness of two or more propositional logic expressions. The satisfiability engine may be hardware, software, or a combination thereof. In some embodiments, the satisfiability engine allows clients (e.g., internal clients such as the propositional logic translator, the policy comparison service 180, etc.) to determine whether a first propositional logic expression is more permissive than a second propositional logic expression. The satisfiability engine may generate additional propositional logic constraints as part of determining whether the first propositional logic expression is more permissive than the second propositional logic expression.

The constraints may be generated and evaluated in addition to constraints of the first propositional logic expression and the second propositional logic expression, which may be encoded in the manner described above. The constraints may be generated based at least in part on what a client requests. For example, the satisfiability engine may generate constraints that are satisfied only under circumstances where a first policy grants access to a resource and a second policy denies access to the resource or is neutral regarding the resource in response to a request from a caller (e.g., the policy comparison service 180) to determine whether a first propositional logic expression is more permissive than a second propositional logic expression. Such an embodiment may be implemented in a deny-by-default context where a neutral context (i.e., a context where no permission explicitly grants or denies access to a particular resource). In an allow-by-default context, the satisfiability engine may generate different constraints that are satisfied where the first policy grants access to a resource or is neutral regarding the resource and the second policy does not deny access to the resource.

The satisfiability engine may be used to verify whether the propositional logic constraints (e.g., those obtained from the first and second propositional logic expressions and those generated by the satisfiability engine) are equivalent. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the satisfiability engine may be implemented at least in part using a satisfiability modulo theories (SMT) constraint solver to determine whether a formula is satisfiable. An example of a SMT-based constraint solver is Z3. Other types of solvers may be utilized in accordance with the techniques described herein as part of implementing a satisfiability engine including but not limited to satisfiability (SAT) solvers and binary decision diagrams (BDD) solvers. The satisfiability engine may generate an equivalence result that indicates whether the formula is satisfiable and, by extension, whether two or more policies are equivalent. In some embodiments, an equivalence result is made available to another computing entity, such as the analyzer 100 that issued a request, a system administrator, and other computing entities.

In some embodiments, a client such as the analyzer 100 may issue a request on behalf of a client to determine the equivalency between two security policies. In some embodiments, the request may include a web API request that encodes the security policies that are to be analyzed as part of the request. However, in some embodiments, the security client computing device may provide a reference to one or more security policies that the recipient of the request may use to obtain the one or more security policies. In some embodiments, a web API request is transmitted from the analyzer 100 to a computing resource service provider such as the provider network 190. The request may be fulfilled by a policy comparison service 180. A first security policy 804A may be parsed to obtain one or more permission statements 806A, and the permissions statements 806A may be translated to a first set of propositional logic expressions 808 which may act as constraints on a propositional logic formula. Likewise, a second security policy 804B may be parsed to obtain one or more permission statements 806B, and the permissions statement 806B may be parsed to obtain a second set of propositional logic expressions 808 which may act as constraints. The service 180 may utilize a satisfiability engine 812 to determine whether the two propositional logic expressions are equivalent, if one is more permissive than the other, and more.

In some embodiments, an equivalence result 812 may indicate that two policies are equivalent. Two policies may be said to be equivalent if the security permissions from the first policy and the second policy apply in the same manner to all actions, resources, and principals, such that, for any given set of actions, resources, and principals, that the first policy and the second policy will both either deny access (either explicitly based on a denial statement or implicitly based on the lack of a permission granting access) or both will grant access. In some embodiments, it will not be the case that one policy grants access and the other denies access. In some embodiments, in the case that one policy is determined to be more permissive than another policy, it will be the case that one policy grants access under a set of parameters where another policy denies access.

In some embodiments, the equivalence result 812 may be transmitted to the analyzer 100 as a response to a web API request. In some embodiments, the equivalence result 812 may encode the permissiveness result (e.g., whether one policy was more permissive than a second policy). In some embodiments, other information is provided either in place of or in addition to the permissiveness result. For example, in the case where a first policy is more permissive than a second policy, the equivalence result 812 may encode a set of parameters that results in a grant of access by the first policy and a denial of access by the second policy (e.g., a principal, resource, and action may be encoded in the response such that a first policy will grant access to the principal to perform the action on the resource and the second policy will deny access to the principal from performing the action on the resource).

Illustrative Computer System

In at least some embodiments, a computer system that implements a portion or all of one or more of the technologies described herein may include a computer system that includes or is configured to access one or more computer-readable media. FIG. 9 illustrates such a computing device 900. In the illustrated embodiment, computing device 900 includes one or more processors 910A-910N coupled to a system memory 920 via an input/output (I/O) interface 930. Computing device 900 further includes a network interface 940 coupled to I/O interface 930.

In various embodiments, computing device 900 may be a uniprocessor system including one processor or a multiprocessor system including several processors 910A-910N (e.g., two, four, eight, or another suitable number). Processors 910A-910N may include any suitable processors capable of executing instructions. For example, in various embodiments, processors 910A-910N may be processors implementing any of a variety of instruction set architectures (ISAs), such as the x86, PowerPC, SPARC, or MIPS ISAs, or any other suitable ISA. In multiprocessor systems, each of processors 910A-910N may commonly, but not necessarily, implement the same ISA.

System memory 920 may be configured to store program instructions and data accessible by processor(s) 910A-910N. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 920 as code (i.e., program instructions) 925 and data 926. In the illustrated embodiment, system memory 920 also stores program code and data that implement aspects of the access control analyzer 100 discussed above.

In one embodiment, I/O interface 930 may be configured to coordinate I/O traffic between processors 910A-910N, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processors 910A-910N). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processors 910A-910N.

Network interface 940 may be configured to allow data to be exchanged between computing device 900 and other devices 960 attached to a network or networks 950. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a computer-readable (i.e., computer-accessible) medium configured to store program instructions and data as described above for implementing embodiments of the corresponding methods and apparatus. For example, system memory 920 may store program code and data associated with the access control analyzer 100. In some embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 900 as system memory 920 or another type of memory. Further, a computer-readable medium may include transmission media or signals such as electrical, electromagnetic, or digital signals, conveyed via a communication medium such as a network and/or a wireless link, such as may be implemented via network interface 940. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

The foregoing may be better understood in view of the following clauses:

Clause 1. A system, comprising:
an access control analyzer comprising one or more processors and one or more memories to store computer-executable instructions that, when executed, cause the one or more processors to:
determine a graph comprising a plurality of nodes and one or more directed edges, wherein the nodes represent a plurality of roles in a provider network hosting a plurality of services and resources, wherein the nodes comprise a first node representing a first role and a second node representing a second role, wherein the roles are associated with a plurality of access control policies granting or denying access to individual ones of the plurality of services and resources, and wherein one or more of the access control policies grant or deny access based at least in part on one or more key-value tags; and
determine, based at least in part on a role reachability analysis of the graph, whether the first role can assume the second role using one or more role assumption steps for a particular state of the one or more key-value tags, wherein an individual one of the role assumption steps provides temporary access during a role session, and wherein the one or more key-value tags comprise one or more transitive tags that persist during the one or more role assumption steps.

Clause 2. The system as recited in clause 1, wherein the access control policies permit the first role to assume the second role if the first role provides a session tag matching a condition associated with the second role.

Clause 3. The system as recited in clause 2, wherein the condition associated with the second role comprises one or more wildcards for a value of a key.

Clause 4. The system as recited in clause 1, wherein the graph is determined by finding one or more neighbors for a particular node in the graph based at least in part on a set of the key-value tags whose keys are explicitly indicated with corresponding conditions in the access control policies or by underspecified key-value tags whose values are unrestricted or partially restricted.

Clause 5. A method, comprising:
determining, by an access control analyzer, a graph comprising a plurality of nodes and one or more edges, wherein the nodes represent a plurality of roles in a provider network hosting a plurality of resources, wherein the nodes comprise a first node representing a first role and a second node representing a second role, wherein the roles are associated with a plurality of access control policies granting or denying access to individual ones of the plurality of resources, and wherein one or more of the access control policies grant or deny access based at least in part on one or more attributes; and determining, by the access control analyzer based at least in part on a role reachability analysis of the graph, whether the first role can assume the second role using one or more role assumption steps for a particular state of the one or more attributes, and wherein the one or more attributes comprise one or more transitive attributes that persist during the one or more role assumption steps.

Clause 6. The method as recited in clause 5, wherein the access control policies permit the first role to assume the second role if the first role provides a session attribute matching a condition associated with the second role.

Clause 7. The method as recited in clause 6, wherein the condition associated with the second role comprises one or more wildcards for a value of a key.

Clause 8. The method as recited in clause 5, further comprising:

aggregating one or more boundary conditions for the one or more attributes, wherein the one or more boundary conditions are indicated by one or more of the access control policies associated with the one or more role assumption steps.

Clause 9. The method as recited in clause 1, wherein one or more neighbors for a particular node in the graph are determined based at least in part on a set of the attributes whose keys are explicitly indicated with corresponding conditions in the access control policies.

Clause 10. The method as recited in clause 1, one or more neighbors for a particular node in the graph are determined based at least in part on underspecified attributes whose values are unrestricted or partially restricted.

Clause 11. The method as recited in clause 5, wherein the first role is in a first account with the provider network, and wherein the second role is in a second account with the provider network.

Clause 12. The method as recited in clause 5, further comprising:

based at least in part on determining that the first role can assume the second role, generating a notification of a security finding regarding a configuration of the access control policies.

Clause 13. One or more non-transitory computer-readable storage media storing program instructions that, when executed on or across one or more processors, perform:

determining, by an access control analyzer, a graph comprising a plurality of nodes and one or more edges, wherein the nodes represent a plurality of roles in a provider network hosting a plurality of services or resources, wherein the nodes comprise a first node representing a first role and a second node representing a second role, wherein the roles are associated with a plurality of access control policies granting or denying access to individual ones of the plurality of services or resources, and wherein one or more of the access control policies grant or deny access based at least in part on one or more tags; and determining, by the access control analyzer based at least in part on a role reachability analysis of the graph, whether the first role can assume the second role using one or more role assumption steps for a particular state of the one or more tags, and wherein the one or more tags comprise one or more transitive tags that persist during the one or more role assumption steps.

Clause 14. The one or more non-transitory computer-readable storage media as recited in clause 13, wherein the access control policies permit the first role to assume the second role if the first role provides a session tag matching a condition associated with the second role.

Clause 15. The one or more non-transitory computer-readable storage media as recited in clause 13, wherein the condition associated with the second role does not comprise one or more wildcards for a value for a key.

Clause 16. The one or more non-transitory computer-readable storage media as recited in clause 13, further comprising additional program instructions that, when executed on or across the one or more processors, perform:

aggregating one or more boundary conditions for the one or more attributes, wherein the one or more boundary conditions are indicated by one or more of the access control policies associated with the one or more role assumption steps.

Clause 17. The one or more non-transitory computer-readable storage media as recited in clause 13, wherein the graph is determined based at least in part on one or more of the tags having keys that are explicitly indicated in the access control policies.

Clause 18. The one or more non-transitory computer-readable storage media as recited in clause 13, wherein the graph is determined based at least in part on application of one or more boundary conditions for the one or more tags, wherein the one or more boundary conditions are indicated by one or more of the access control policies associated with the one or more role assumption steps.

Clause 19. The one or more non-transitory computer-readable storage media as recited in clause 13, further comprising additional program instructions that, when executed on or across the one or more processors, perform:

monitoring calls to the plurality of services in the provider network; and if the calls are determined to change a state of the provider network, restarting the role reachability analysis.

Clause 20. The one or more non-transitory computer-readable storage media as recited in clause 13, wherein the graph is determined using a policy comparison service that determines a semantic difference between two of the access control policies.

Clause 21. A system, comprising:

an access control analyzer comprising one or more processors and one or more memories to store computer-executable instructions that, when executed, cause the one or more processors to:

determine a first node in a graph, wherein the first node corresponds to a first role in a provider network hosting a plurality of services and resources, wherein the first role is associated with a first access control policy, and wherein the first access control policy grants or denies access to a first one of the services and resources;

determine a second node in the graph, wherein the second node corresponds to a second role in the provider network, wherein the second role is associated with a second access control policy, and wherein the second access control policy grants or denies access to a second one of the services and resources;

perform a role reachability analysis that determines whether the first role can assume the second role for a particular state of one or more key-value tags, wherein the one or more role assumption steps provide temporary access during a role session, wherein the role reachability analysis determines a third access control policy authorizing a complement of a role assumption request for the second role, wherein the role reachability analysis determines whether the first role can assume the second role based at least in part on an analysis of the third access control policy with respect to a role assumption policy for the second role for the particular state of the one or more key-value tags, and wherein the role assumption request is not authorized if the third access control policy does not include the role assumption policy for the second role for the particular state of the one or more key-value tags; and based at least in part on the role reachability analysis, grant or deny access to the second one of the services and resources to a principal in the first role.

Clause 22. The system as recited in clause 21, wherein the role assumption policy for the second role is extended to include one or more statements denying requests that fail to satisfy one or more conditions of the role assumption policy for the second role.

Clause 23. The system as recited in clause 21, wherein one or more conditions of the role assumption policy for the second role comprise one or more wildcards for the one or more key-value tags.

Clause 24. The system as recited in clause 23, wherein the role reachability analysis selects one or more representative values for the one or more key-value tags from a range of potential values for the one or more key-value tags, wherein the range of potential values is determined based at least in part on the one or more wildcards, and wherein the particular state of the one or more key-value tags is determined based at least in part on the one or more representative values for the one or more key-value tags.

Clause 25. A method, comprising:
determining, by an access control analyzer, a first node in a graph, wherein the first node corresponds to a first role in a provider network hosting a plurality of resources, wherein the first role is associated with a first access control policy, and wherein the first access control policy grants or denies access to a first one or more of the resources;
determining, by the access control analyzer, a second node in the graph, wherein the second node corresponds to a second role in the provider network, wherein the second role is associated with a second access control policy, and wherein the second access control policy grants or denies access to a second one or more of the resources; and
performing, by the access control analyzer, a role reachability analysis that determines whether the first role can assume the second role for a particular state of one or more attributes, the role reachability analysis comprising:
determining a third access control policy authorizing a negation of a role assumption request for the second role; and
determining whether the first role can assume the second role based at least in part on analysis of the third access control policy with respect to a role assumption policy for the second role for the particular state of the one or more attributes.

Clause 26. The method as recited in clause 25, further comprising:
based at least in part on the role reachability analysis, granting or denying access to the second one or more of the resources to a principal in the first role.

Clause 27. The method as recited in clause 25, wherein the role assumption policy for the second role is extended to include one or more statements denying requests that fail to satisfy one or more conditions of the role assumption policy for the second role.

Clause 28. The method as recited in clause 25, wherein the role assumption request is not authorized if the third access control policy does not comprise the role assumption policy for the second role for the particular state of the one or more attributes.

Clause 29. The method as recited in clause 25, wherein the role reachability analysis calls a policy comparison service that determines an equivalence result for the third access control policy and the role assumption policy for the second role for the particular state of the one or more attributes.

Clause 30. The method as recited in clause 25, wherein one or more conditions of the role assumption policy for the second role comprise one or more wildcards for the one or more attributes.

Clause 31. The method as recited in clause 30, wherein performing the role reachability analysis further comprises:
selecting one or more representative values for the one or more attributes from a range of potential values for the one or more attributes, wherein the range of potential values is determined based at least in part on the one or more wildcards, and wherein the particular state of the one or more attributes is determined based at least in part on the one or more representative values for the one or more attributes.

Clause 32. The method as recited in clause 25, further comprising:
based at least in part on determining that the first role can assume the second role, generating a notification of a security finding regarding an access control policy configuration.

Clause 33. One or more non-transitory computer-readable storage media storing program instructions that, when executed on or across one or more processors, perform:
determining, by an access control analyzer, a first node in a graph, wherein the first node corresponds to a first role in a provider network hosting a plurality of services or resources, wherein the first role is associated with a first access control policy, and wherein the first access control policy grants or denies access to a first one or more of the services or resources;
determining, by the access control analyzer, a second node in the graph, wherein the second node corresponds to a second role in the provider network, wherein the second role is associated with a second access control policy, and wherein the second access control policy grants or denies access to a second one or more of the services or resources; and
performing, by the access control analyzer, a role reachability analysis that determines whether the first role can assume the second role for a particular state of one or more tags, the role reachability analysis comprising:
determining a third access control policy authorizing a complement of a role assumption request for the second role; and
determining whether the first role can assume the second role based at least in part on analysis of the third access control policy with respect to a role assumption policy for the second role for the particular state of the one or more tags.

Clause 34. The one or more non-transitory computer-readable storage media as recited in clause 33, further comprising additional program instructions that, when executed on or across the one or more processors, perform:
based at least in part on the role reachability analysis, granting or denying access to the second one or more of the services or resources to a user in the first role.

Clause 35. The one or more non-transitory computer-readable storage media as recited in clause 33, wherein the role assumption policy for the second role is extended to include one or more statements denying requests that fail to satisfy one or more conditions of the role assumption policy for the second role.

Clause 36. The one or more non-transitory computer-readable storage media as recited in clause 33, wherein the role assumption request is not authorized if the third access control policy does not comprise the role assumption policy for the second role for the particular state of the one or more tags.

Clause 37. The one or more non-transitory computer-readable storage media as recited in clause 33, wherein the role reachability analysis calls a policy comparison service that determines an equivalence result for the third access control policy and the role assumption policy for the second role for the particular state of the one or more tags.

Clause 38. The one or more non-transitory computer-readable storage media as recited in clause 33, wherein one or more conditions of the role assumption policy for the second role comprise one or more wildcards for the one or more tags.

Clause 39. The one or more non-transitory computer-readable storage media as recited in clause 38, further comprising additional program instructions that, when executed on or across the one or more processors, perform:
selecting one or more representative values for the one or more tags from a range of potential values for the one or more tags, wherein the range of potential values is determined based at least in part on the one or more wildcards, and wherein the particular state of the one or more tags is determined based at least in part on the one or more representative values for the one or more tags.

Clause 40. The one or more non-transitory computer-readable storage media as recited in clause 33, further comprising additional program instructions that, when executed on or across the one or more processors, perform:
based at least in part on determining that the first role can assume the second role, generating a notification of a security finding regarding an access control policy configuration.

What is claimed is:

1. A system, comprising:
an access control analyzer comprising one or more processors and one or more memories to store computer-executable instructions that, when executed, cause the one or more processors to:
determine a first node in a graph, wherein the first node corresponds to a first role in a provider network hosting a plurality of services and resources, wherein the first role is associated with a first access control policy, and wherein the first access control policy grants or denies access to a first one of the services and resources;
determine a second node in the graph, wherein the second node corresponds to a second role in the provider network, wherein the second role is associated with a second access control policy, and wherein the second access control policy grants or denies access to a second one of the services and resources;
perform a role reachability analysis that determines whether the first role can assume the second role for a particular state of one or more key-value tags, wherein one or more role assumption steps provide temporary access during a role session, wherein the role reachability analysis determines a third access control policy authorizing a complement of a role assumption request for the second role, wherein the role reachability analysis determines whether the first role can assume the second role based at least in part on an analysis of the third access control policy with respect to a role assumption policy for the second role for the particular state of the one or more key-value tags, and wherein the role assumption request is not authorized when the third access control policy does include the role assumption policy for the second role for the particular state of the one or more key-value tags; and
based at least in part on the role reachability analysis, grant or deny access to the second one of the services and resources to a principal in the first role.

2. The system as recited in claim 1, wherein the role assumption policy for the second role is extended to include one or more statements denying requests that fail to satisfy one or more conditions of the role assumption policy for the second role.

3. The system as recited in claim 1, wherein one or more conditions of the role assumption policy for the second role comprise one or more wildcards for the one or more key-value tags.

4. The system as recited in claim 3, wherein the role reachability analysis selects one or more representative values for the one or more key-value tags from a range of potential values for the one or more key-value tags, wherein the range of potential values is determined based at least in part on the one or more wildcards, and wherein the particular state of the one or more key-value tags is determined based at least in part on the one or more representative values for the one or more key-value tags.

5. A method, comprising:
determining, by an access control analyzer, a first node in a graph, wherein the first node corresponds to a first role in a provider network hosting a plurality of resources, wherein the first role is associated with a first access control policy, and wherein the first access control policy grants or denies access to a first one or more of the resources;
determining, by the access control analyzer, a second node in the graph, wherein the second node corresponds to a second role in the provider network, wherein the second role is associated with a second access control policy, and wherein the second access control policy grants or denies access to a second one or more of the resources; and
performing, by the access control analyzer, a role reachability analysis that determines whether the first role can assume the second role for a particular state of one or more attributes, the role reachability analysis comprising:
determining a third access control policy authorizing a negation of a role assumption request for the second role, wherein the negation of the role assumption request authorizes all actions except for assumption of the second role; and
determining whether the first role can assume the second role based at least in part on analysis of the third access control policy with respect to a role assumption policy for the second role for the particular state of the one or more attributes.

6. The method as recited in claim 5, further comprising:
based at least in part on the role reachability analysis, granting or denying access to the second one or more of the resources to a principal in the first role.

7. The method as recited in claim 5, wherein the role assumption policy for the second role is extended to include one or more statements denying requests that fail to satisfy one or more conditions of the role assumption policy for the second role.

8. The method as recited in claim 5, wherein the role assumption request is not authorized if the third access control policy does not comprise the role assumption policy for the second role for the particular state of the one or more attributes.

9. The method as recited in claim 5, wherein the role reachability analysis calls a policy comparison service that determines an equivalence result for the third access control policy and the role assumption policy for the second role for the particular state of the one or more attributes.

10. The method as recited in claim 5, wherein one or more conditions of the role assumption policy for the second role comprise one or more wildcards for the one or more attributes.

11. The method as recited in claim 10, wherein performing the role reachability analysis further comprises:
selecting one or more representative values for the one or more attributes from a range of potential values for the one or more attributes, wherein the range of potential values is determined based at least in part on the one or more wildcards, and wherein the particular state of the one or more attributes is determined based at least in part on the one or more representative values for the one or more attributes.

12. The method as recited in claim 5, further comprising:
based at least in part on determining that the first role can assume the second role, generating a notification of a security finding regarding an access control policy configuration.

13. One or more non-transitory computer-readable storage media storing program instructions that, when executed on or across one or more processors, perform:
determining, by an access control analyzer, a first node in a graph, wherein the first node corresponds to a first role in a provider network hosting a plurality of services or resources, wherein the first role is associated with a first access control policy, and wherein the first access control policy grants or denies access to a first one or more of the services or resources;
determining, by the access control analyzer, a second node in the graph, wherein the second node corresponds to a second role in the provider network, wherein the second role is associated with a second access control policy, and wherein the second access control policy grants or denies access to a second one or more of the services or resources; and
performing, by the access control analyzer, a role reachability analysis that determines whether the first role can assume the second role for a particular state of one or more tags, the role reachability analysis comprising:

determining a third access control policy authorizing a complement of a role assumption request for the second role, wherein the complement of the role assumption request authorizes all actions except for assumption of the second role; and
determining whether the first role can assume the second role based at least in part on analysis of the third access control policy with respect to a role assumption policy for the second role for the particular state of the one or more tags.

14. The one or more non-transitory computer-readable storage media as recited in claim 13, further comprising additional program instructions that, when executed on or across the one or more processors, perform:
based at least in part on the role reachability analysis, granting or denying access to the second one or more of the services or resources to a user in the first role.

15. The one or more non-transitory computer-readable storage media as recited in claim 13, wherein the role assumption policy for the second role is extended to include one or more statements denying requests that fail to satisfy one or more conditions of the role assumption policy for the second role.

16. The one or more non-transitory computer-readable storage media as recited in claim 13, wherein the role assumption request is not authorized if the third access control policy does not comprise the role assumption policy for the second role for the particular state of the one or more tags.

17. The one or more non-transitory computer-readable storage media as recited in claim 13, wherein the role reachability analysis calls a policy comparison service that determines an equivalence result for the third access control policy and the role assumption policy for the second role for the particular state of the one or more tags.

18. The one or more non-transitory computer-readable storage media as recited in claim 13, wherein one or more conditions of the role assumption policy for the second role comprise one or more wildcards for the one or more tags.

19. The one or more non-transitory computer-readable storage media as recited in claim 18, further comprising additional program instructions that, when executed on or across the one or more processors, perform:
selecting one or more representative values for the one or more tags from a range of potential values for the one or more tags, wherein the range of potential values is determined based at least in part on the one or more wildcards, and wherein the particular state of the one or more tags is determined based at least in part on the one or more representative values for the one or more tags.

20. The one or more non-transitory computer-readable storage media as recited in claim 13, further comprising additional program instructions that, when executed on or across the one or more processors, perform:
based at least in part on determining that the first role can assume the second role, generating a notification of a security finding regarding an access control policy configuration.

* * * * *